(12) United States Patent
Liu et al.

(10) Patent No.: US 8,951,440 B2
(45) Date of Patent: *Feb. 10, 2015

(54) NITRIDE-BASED RED-EMITTING PHOSPHORS IN RGB (RED-GREEN-BLUE) LIGHTING SYSTEMS

(71) Applicant: Intematix Corporation, Fremont, CA (US)

(72) Inventors: Shengfeng Liu, Newark, CA (US); Dejie Tao, Fremont, CA (US); Xianglong Yuan, Fremont, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/626,684

(22) Filed: Sep. 25, 2012

(65) Prior Publication Data

US 2013/0234586 A1    Sep. 12, 2013

Related U.S. Application Data

(63) Continuation of application No. 12/632,550, filed on Dec. 7, 2009, now Pat. No. 8,274,215, and a continuation-in-part of application No. 12/250,400, filed on Oct. 13, 2008.

(60) Provisional application No. 61/122,569, filed on Dec. 15, 2008, provisional application No. 61/054,399, filed on May 19, 2008.

(51) Int. Cl.
*C09K 11/59*    (2006.01)
*C09K 11/64*    (2006.01)
(Continued)

(52) U.S. Cl.
CPC .............. *C09K 11/7734* (2013.01); *C04B 35/58* (2013.01); *C04B 35/581* (2013.01);
(Continued)

(58) Field of Classification Search
USPC ......... 252/301.4 F, 301.4 H; 313/503; 257/98
See application file for complete search history.

(56) References Cited

U.S. PATENT DOCUMENTS 3,207,583 A    9/1965    Brautigam et al.
6,649,946 B2    11/2003    Bogner et al.
(Continued)

FOREIGN PATENT DOCUMENTS

CN    1977030 A    6/2007
DE    102006027133 A1    12/2007
(Continued)

OTHER PUBLICATIONS

Xie, Rong-Jun et al., "Silicon-based oxynitride and nitride phosphors for white LEDs—a review," Science and Technology of Advanced Materials, Oct. 23, 2007, pp. 588-600, vol. 8.
(Continued)

*Primary Examiner* — Carol M Koslow
(74) *Attorney, Agent, or Firm* — David H. Jaffer; Pillsbury Winthrop Shaw Pittman LLP

(57) ABSTRACT

Embodiments of the present invention are directed to nitride-based, red-emitting phosphors in red, green, and blue (RGB) lighting systems, which in turn may be used in backlighting displays and warm white-light applications. In particular embodiments, the red-emitting phosphor is based on $CaAlSiN_3$ type compounds activated with divalent europium. In one embodiment, the nitride-based, red emitting compound contains a solid solution of calcium and strontium compounds $(Ca,Sr)AlSiN_3:Eu^{2+}$, wherein the impurity oxygen content is less than about 2 percent by weight. In another embodiment, the $(Ca,Sr)AlSiN_3:Eu^{2+}$ compounds further contains a halogen in an amount ranging from about zero to about 2 atomic percent, where the halogen may be fluorine (F), chlorine (Cl), or any combination thereof. In one embodiment at least half of the halogen is distributed on 2-fold coordinated nitrogen (N2) sites relative to 3-fold coordinated nitrogen (N3) sites.

16 Claims, 28 Drawing Sheets

(51) Int. Cl.
   *H01L 33/50* (2010.01)
   *C09K 11/77* (2006.01)
   *C04B 35/58* (2006.01)
   *C04B 35/581* (2006.01)
   *C04B 35/584* (2006.01)
   *C09K 11/08* (2006.01)
   *H05B 33/12* (2006.01)

(52) U.S. Cl.
   CPC ....... *C04B35/584* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3286* (2013.01); *C04B 2235/3409* (2013.01); *C04B 2235/3852* (2013.01); *C04B 2235/3865* (2013.01); *C04B 2235/3873* (2013.01); *C04B 2235/3895* (2013.01); *C04B 2235/444* (2013.01); *C04B 2235/445* (2013.01); *C04B 2235/723* (2013.01); *C09K 11/0883* (2013.01); *Y02B 20/181* (2013.01); *H05B 33/12* (2013.01)
   USPC ............. 252/301.4 F; 252/301.4 H; 313/503; 257/98

(56) References Cited

U.S. PATENT DOCUMENTS

| | | | |
|---|---|---|---|
| 7,026,755 | B2 | 4/2006 | Setlur et al. |
| 7,138,756 | B2 | 11/2006 | Gotoh et al. |
| 7,229,573 | B2 | 6/2007 | Setlur et al. |
| 7,252,787 | B2 | 8/2007 | Hancu et al. |
| 7,252,788 | B2 | 8/2007 | Nagatomi et al. |
| 7,258,816 | B2 | 8/2007 | Tamaki et al. |
| 7,311,858 | B2 | 12/2007 | Wang et al. |
| 7,345,418 | B2 | 3/2008 | Nagatomi et al. |
| 7,476,337 | B2 | 1/2009 | Sakane et al. |
| 7,476,338 | B2 | 1/2009 | Sakane et al. |
| 7,507,354 | B2 | 3/2009 | Oshio |
| 7,537,710 | B2 | 5/2009 | Oshio |
| 7,540,977 | B2 | 6/2009 | Hirosaki et al. |
| 7,575,679 | B2 | 8/2009 | Sumino et al. |
| 7,597,823 | B2 | 10/2009 | Tamaki et al. |
| 7,671,529 | B2 | 3/2010 | Mueller et al. |
| 7,700,002 | B2 | 4/2010 | Schmidt et al. |
| 7,713,443 | B2 | 5/2010 | Hirosaki et al. |
| 7,824,573 | B2 * | 11/2010 | Watanabe et al. ....... 252/301.4 F |
| 8,123,980 | B2 * | 2/2012 | Kijima et al. ........... 252/301.4 F |
| 8,274,215 | B2 * | 9/2012 | Liu et al. ...................... 313/504 |
| 2005/0189863 | A1 | 9/2005 | Nagatomi et al. |
| 2006/0017365 | A1 | 1/2006 | Nagatomi et al. |
| 2006/0027786 | A1 | 2/2006 | Dong et al. |
| 2006/0033083 | A1 * | 2/2006 | Sakane et al. .......... 252/301.4 F |
| 2006/0065878 | A1 * | 3/2006 | Sakane et al. ........... 252/301.4 F |
| 2006/0091790 | A1 | 5/2006 | Nagatomi et al. |
| 2006/0145123 | A1 | 7/2006 | Li et al. |
| 2006/0255710 | A1 | 11/2006 | Mueller-Mach et al. |
| 2007/0007494 | A1 * | 1/2007 | Hirosaki et al. ....... 252/301.4 R |
| 2007/0029526 | A1 | 2/2007 | Cheng et al. |
| 2007/0040152 | A1 | 2/2007 | Oshio |
| 2007/0189352 | A1 | 8/2007 | Nagahama et al. |
| 2007/0257596 | A1 | 11/2007 | Shimomura et al. |
| 2008/0116786 | A1 | 5/2008 | Wang et al. |
| 2008/0128726 | A1 | 6/2008 | Sakata et al. |
| 2008/0143246 | A1 | 6/2008 | Hirosaki et al. |
| 2008/0303409 | A1 | 12/2008 | Hirosaki |
| 2009/0114929 | A1 | 5/2009 | Lee et al. |
| 2009/0166584 | A1 | 7/2009 | Shimooka et al. |
| 2009/0189507 | A1 | 7/2009 | Winkler et al. |
| 2009/0243467 | A1 | 10/2009 | Shimizu et al. |
| 2009/0251044 | A1 | 10/2009 | Shioi |
| 2009/0267485 | A1 | 10/2009 | Nagatomi et al. |
| 2009/0283721 | A1 | 11/2009 | Liu et al. |
| 2009/0322209 | A1 | 12/2009 | Becker et al. |
| 2009/0322990 | A1 | 12/2009 | Kawana et al. |
| 2010/0039020 | A1 | 2/2010 | Hirosaki |
| 2010/0044729 | A1 | 2/2010 | Naum et al. |
| 2010/0052515 | A1 | 3/2010 | Watanabe et al. |
| 2010/0085728 | A1 | 4/2010 | Seto et al. |
| 2010/0123104 | A1 | 5/2010 | Collins et al. |
| 2010/0213822 | A1 | 8/2010 | Shimooka et al. |
| 2011/0031874 | A1 | 2/2011 | Hosokawa et al. |
| 2011/0176084 | A1 | 7/2011 | Akiho et al. |

FOREIGN PATENT DOCUMENTS

| | | |
|---|---|---|
| EP | 1568753 A2 | 8/2005 |
| EP | 1777280 A1 | 4/2007 |
| EP | 1837386 A1 | 9/2007 |
| EP | 1867697 A1 | 12/2007 |
| EP | 1878778 A1 | 1/2008 |
| EP | 1887067 A1 | 2/2008 |
| JP | 2005-226000 A | 8/2005 |
| JP | 2006 063214 A | 3/2006 |
| JP | 2006063214 A | 3/2006 |
| JP | 2006 124501 A | 5/2006 |
| JP | 2008-001908 A | 1/2008 |
| JP | 2008-163259 A | 7/2008 |
| JP | 2008 189811 A | 8/2008 |
| WO | WO 2005/116163 A1 | 12/2005 |
| WO | WO 2006/106948 * | 10/2006 |
| WO | WO 2007/135975 * | 11/2007 |

OTHER PUBLICATIONS

Li et al., "Luminescence properties of red-emitting $M_2Si_5N_8$:$Eu^{2+}$(M=Ca, Sr, Ba) LED conversion phosphors," J. of Alloys and Compounds, 2006, pp. 273-279, vol. 417.

Uheda, K. et al., "Luminescence properties of a red phosphor, $CaAlSiN_3$: $Eu^{2+}$, for white light-emitting diodes," Electrochemical and Solid-State Letters, 2006, pp. H22-H25, vol. 9, No. 4.

* cited by examiner

PRIOR ART  Fig. 1A

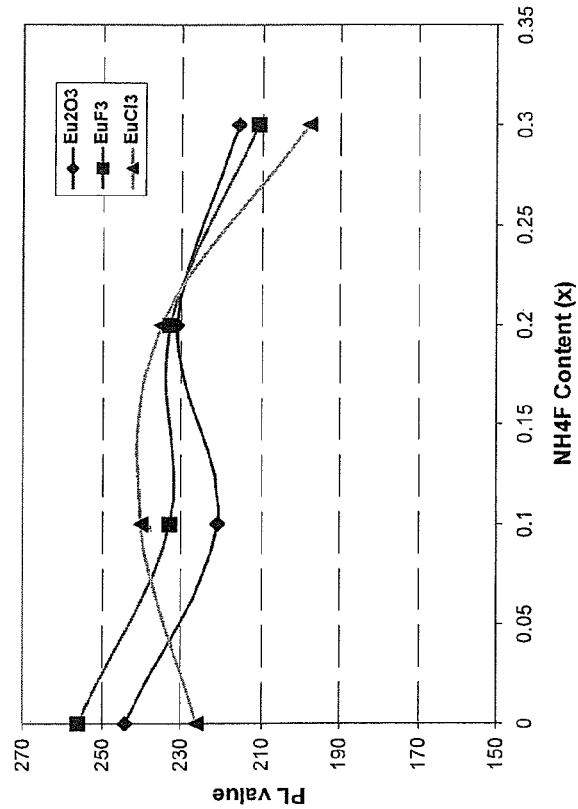
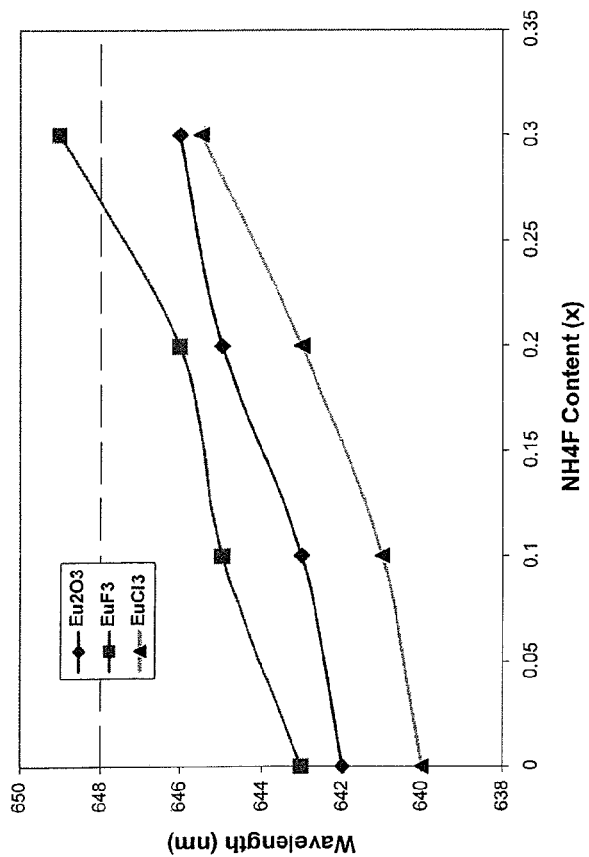
Fig. 6B
Fig. 6A

| CIE x | CIE y | CCT | Brightness | Domi. | Purity | Ra | Rall | R9~12 |
|---|---|---|---|---|---|---|---|---|
| 0.437 | 0.406 | 3002 | 0.82 | 583 | 53 | 90 | 86 | 76 |

| R1 | R2 | R3 | R4 | R5 | R6 | R7 | R8 | R9 | R10 | R11 | R12 | R13 | R14 | R15 |
|---|---|---|---|---|---|---|---|---|---|---|---|---|---|---|
| 94 | 92 | 86 | 91 | 91 | 89 | 91 | 86 | 63 | 77 | 91 | 73 | 93 | 91 | 90 |

| CIE x | CIE y | CCT | Brightness | Domi. | Purity | Ra | Rall | R9~12 |
|---|---|---|---|---|---|---|---|---|
| 0.437 | 0.404 | 2985 | 0.76 | 583 | 52 | 92 | 91 | 86 |

| R1 | R2 | R3 | R4 | R5 | R6 | R7 | R8 | R9 | R10 | R11 | R12 | R13 | R14 | R15 |
|---|---|---|---|---|---|---|---|---|---|---|---|---|---|---|
| 98 | 95 | 84 | 89 | 96 | 92 | 91 | 94 | 95 | 84 | 88 | 79 | 99 | 89 | 98 |

| CIE x | CIE y | CCT | Brightness | Domi. | Purity | Ra | Rall | R9~12 |
|---|---|---|---|---|---|---|---|---|
| 0.437 | 0.402 | 2973 | 0.92 | 583 | 52 | 79 | 72 | 52 |

| R1 | R2 | R3 | R4 | R5 | R6 | R7 | R8 | R9 | R10 | R11 | R12 | R13 | R14 | R15 |
|---|---|---|---|---|---|---|---|---|---|---|---|---|---|---|
| 79 | 84 | 84 | 79 | 76 | 75 | 85 | 68 | 23 | 59 | 74 | 51 | 79 | 90 | 76 |

| CIE x | CIE y | CCT | Brightness | Domi. | Purity | Ra | Rall | R9~12 |
|---|---|---|---|---|---|---|---|---|
| 0.477 | 0.426 | 2584 | 3.34 | 584 | 71 | 79 | 72 | 51 |

| R1 | R2 | R3 | R4 | R5 | R6 | R7 | R8 | R9 | R10 | R11 | R12 | R13 | R14 | R15 |
|---|---|---|---|---|---|---|---|---|---|---|---|---|---|---|
| 77 | 85 | 91 | 77 | 74 | 77 | 88 | 64 | 18 | 64 | 71 | 50 | 78 | 94 | 73 |

NITRIDE-BASED RED-EMITTING PHOSPHORS IN RGB (RED-GREEN-BLUE) LIGHTING SYSTEMS

CROSS-REFERENCE TO RELATED APPLICATIONS

The present application is a continuation of, and claims priority to, U.S. patent application Ser. No. 12/632,550 filed Dec. 7, 2009, now U.S. Pat. No. 8,274,215, which claims priority to U.S. Provisional Patent Application No. 61/122,569 filed Dec. 15, 2008, and is a continuation-in-part of, and claims priority to, U.S. patent application Ser. No. 12/250,400 filed Oct. 13, 2008, which claims priority to U.S. Provisional Patent Application No. 61/054,399 filed May 19, 2008. The disclosures of the aforementioned applications are all incorporated by reference herein in their entirety.

FIELD OF THE INVENTION

Embodiments of the present invention are directed to nitride-based, red-emitting phosphors, which may be used in red, green, and blue (RGB) lighting systems, which in turn may be used in backlighting displays and warm white-light applications. In particular embodiments, the red-emitting phosphor is based on (Ca, Sr, Ba)AlSiN$_3$ type compounds activated with divalent europium.

BACKGROUND OF THE INVENTION

There is a need in the field(s) of optical engineering for red, green, and blue lighting systems in various devices, applications, and technologies. Among these technologies are backlighting sources for display systems, such as plasma displays, and warm-white light sources in general lighting.

Various configurations of LED light sources and light-emitting phosphors are possible in the design of such RGB systems. The conventional one, shown schematically in FIG. 1A, employs three light emitting diodes (LEDs). Each of the three LEDs is a semiconductor-based integrated circuit, or "chip", and there is one chip for each of the red, green, and blue colors—a red LED 20 for generating red light 20L, a green LED 21 for generating green light 21L, and a blue LED 22 for generating blue light 22L. A disadvantage of the conventional system is that a separate electrical current controller is needed for each LED, like in many situations, it is better to have as few current controllers in the system as is possible. The prior art system of FIG. 1A requires three circuit controllers.

The RGB systems depicted in FIGS. 1B-D differ from that of FIG. 1A in that they have at least one photoluminescent substance (a "phosphor") substituting for at least one of the red, green, or blue LEDs of the system. The progression from FIGS. 1A-1D shows the effect of replacing LEDs with phosphors; in no particular order regarding color, first the green LED is replaced with a green phosphor 23P (going from FIG. 1A to 1B)), where the green phosphor 23P generates green light 23L; then the red LED is replaced with a red phosphor 24P along with the green (going from FIG. 1B to 1C), where the red phosphor 24P generates red light 24L; finally, all three visible light emitting LEDs are replaced in FIG. 1D with phosphors, although a UV-emitting LED 25 has been added to this system to provide excitation radiation to the phosphors. Thus, FIG. 1D depicts a strategy that is in a sense somewhat opposite to that of FIG. 1A, in that each of the RGB colors in FIG. 1D is provided by a phosphor, including a red phosphor 26P for generating red light 26L, a green phosphor 28P for generating green light 28L, and a blue phosphor 27P for generating blue light 27L, and therefore the excitation source is a non-visible, UV emitting LED. The practice of technologies based on a UV excitation source are somewhat further away from commercialization than those based on blue LEDs, but nonetheless, the configuration of FIG. 1D is still one in which the present nitride-based red phosphors may be used.

This means that no blue phosphors are used in the embodiments of FIGS. 1B and 1C because the blue LED provides the blue component of the light needed in various applications like backlighting and warm-white light general lighting. In this regard the blue LED is unique in the system because it serves a dual role; in addition to providing blue light to the final light product, it provides excitation to either or both of the red or green phosphors in the system. Systems such as those depicted in FIGS. 1C and 1D are the subject of the present disclosure; these configurations are particularly suited for silicon nitride based red-emitting phosphors.

Since earlier versions of these red phosphors were based on nitrides of silicon, they may be generically referred to as "nitride-based" silicates, or nitridosilicates. Newer versions have included aluminum such that the resulting compounds are referred to as "nitridoaluminosilicate nitrides." The deliberate inclusion of oxygen into these crystals in a desired stoichiometric manner gives rise to a certain class of red-emitting phosphors, and compounds known as "SiAlONs" can also be in some cases sources of green and yellow-green illumination. When oxygen substitutes for nitrogen the resulting compound may be described as an "oxynitrides."

As alluded to earlier, a combination of LED-generated blue light, and phosphor-generated green and red light, may be used to generate the white light from a so-called "white LED." Previously known white light generating systems used a blue LED in conjunction with a yellow emitting, cerium-doped, yttrium aluminum garnet known as "YAG," having the formula Y$_3$Al$_5$O$_{12}$:Ce$^{3+}$. Such systems have correlated temperatures (CCTs) of greater than about 4,500 K, and color rendering indexes (CRIs) ranging from about 75 to 82. The blue emitting LED provides excitation radiation ranging from about 400 to 480 nm.

One way of achieving a flexibility of design in blue LED-based devices involves creating a wider separation between the yellow and/or green phosphors, and the red phosphors, the phosphors relative to one another in CIE space. CIE coordinates will be discussed further later in this disclosure, but suffice it to say for now that "CIE space" means the area in a triangle mapped by two vertices of a triangle defined by phosphors, and the third by the blue LED. A yellow and/or green apex widely separated from that of the blue LED create a rich diversity of components for white light generation.

As described in U.S. Pat. No. 7,252,787 to D. Hancu et al., red sources were used with YAG and TAG-based yellow sources to produce a high color rendering index have included nitrides having the formula (Ba,Sr,Ca)$_x$Si$_y$N$_z$:Eu$^{2+}$, where each of the x, y, and z parameters was greater than zero. A disadvantage of such phosphors used with YAG/TAG was that they reabsorb emissions from those phosphors due to overlapping of the Eu$^{2+}$ absorption bands with the emission of the (Tb,Y)$_3$Al$_5$O$_{12}$:Ce$^{3+}$)phosphors. Thus, there is a need for red phosphors having a redder emission than these nitrides to produce white light illumination with high CRI.

Host lattices for new red-emitting phosphors based on nitridosilicate compounds were introduced in the mid-1990's. Such phosphors have desirable mechanical and thermal properties due to a three dimensional network of cross-linked SiN$_4$ tetrahedra in which alkali earth ions (M=Ca, Sr, and Ba) are incorporated. The formula used in U.S. Pat. No. 6,649,946 to Bogner et al. to describe such phosphors was $M_xSi_yN_z$, where M was at least one of an alkaline earth metal, and where $z=2/x+4/3y$. The nitrogen of these nitrides increased the content of colvalent bonding, and thus ligand-field splitting. This lead to a pronounced shift of excitation and emission bands to longer wavelengths in comparison to oxide lattices.

The effect of the alkaline earth component of such nitridosilicates when y is 5 was investigated by Y. Q. Li et al. in "Luminescence properties of red-emitting $M_2Si_5N_8:Eu^{2+}$ (M=Ca, Sr, Ba) LED conversion phosphors," *J. of Alloys and Compounds* 417 (2006), pp. 273-279. Polycrystalline powders were prepared by a solid state reaction mechanism. The crystal structure of the Ca-containing member of this family was monoclinic with space group Cc, whereas the Sr and Ba members were isostructral with orthorhombic space group $Pmn2_1$. There was a formation of a complete solid solution between the Sr and Ba end-members in the latter compound(s).

As taught by Li et al., the excitation spectra are not substantially dependent on the type of alkaline earth, but the position of the emission bands are. The peak emission bands for a 1 mole percent activator concentration were 605, 610, and 574 nm, for M=Ca, Sr, and Ba. The shift in the emission band with the nature of the alkaline earth is due to a difference in the Stokes shift for each of the members, where the Stokes shift gradually increases with the sequence Ca>Sr>Ba, and this trend is predictable if one observes that the relaxation of the $4f^65d'$ state becomes less restricted when the size of the alkaline-earth ion decreases. Further, the Stokes shift increases for as the Eu concentration is increased in all cases.

US 2007/0040152 elucidated the difficulties in producing a nitridosilicate based compound such as $M_2Si_5N_8$, $MSi_7N_{10}$, and $MSiN_2$, where M is at least one element selected from Mg, Ca, Sr, and Ba, etc., and where the compound contains substantially no oxygen. This may be achieved, it is taught, by using as starting materials the nitrides of the alkaline-earth elements and the rare earth elements, but these nitrides are difficult to obtain, expensive, and difficult to handle. These factors conspire to make nitridosilicate-based phosphors difficult to produce industrially. As stated by the reference: "the conventional nitridosilicate-based compound has the following problems: (1) low purity due to the presence of a large amount of impurity oxygen, (2) low material performance of a phosphor caused by the low purity; (3) high cost; and the like." The problems included low luminous flux and brightness.

What is needed in the art are red-emitting phosphors in red, green, and blue (RGB) lighting systems for use in backlighting displays and warm white-light applications, where the red phosphors have high luminous flux and brightness. The present disclosure describes improvements in red-emitting phosphor based on $CaAlSiN_3$ type compounds activated with divalent europium. In conjunction with phosphors emitting at other wavelengths, it is believed the present embodiments provide general illumination sources having higher CRIs and lower CCTs than those currently available.

SUMMARY OF THE INVENTION

Embodiments of the present invention are directed to nitride-based, red-emitting phosphors, which may be used in red, green, and blue (RGB) lighting systems. These RBG systems may in turn be used in backlighting displays and warm white-light applications. In particular embodiments, the red-emitting phosphor is based on $(Ca,Sr,Ba)AlSiN_3$ activated with divalent europium, where the (Ca,Sr,Ba) nomenclature means any of these alkaline earths may be used, in any proportion one relative to the others. Strontium (Sr) may substitute for Ca in the formula, in any combination of amounts; in one embodiment a complete solid solution of calcium and strontium containing compounds $(Ca,Sr)AlSiN_3$ compounds are disclosed where the impurity oxygen content is less than about 2 percent by weight. The present nitride-based, red emitting compounds may further comprise a halogen, whose content ranges from greater than about zero to about 2 atomic percent, which halogen in one embodiment may be selected from the group consisting of F and Cl. It is believed the halogen may provide some sort of a gettering effect during synthesis, and this may be the mechanism by which the oxygen impurity content is kept to low levels. In one embodiment of the present invention, at least half of the halogen is distributed on 2-fold coordinated nitrogen (N2) sites relative to 3-fold coordinated nitrogen (N3) sites.

BRIEF DESCRIPTION OF THE DRAWINGS

FIGS. 1A-1D show various configurations and ways of arranging LEDs and phosphors to provide RGB light for use in white LED and backlighting situations;

FIGS. 6A and 6B are graphs of the emission wavelength and photoluminescence (PL), respectively, of the changes that occur when the fluorine content x supplied by $NH_4F$ is increased above various halogen baseline levels; the three compounds being $Ca_{0.16}Sr_{0.82}AlSiN_3Eu_{0.02}:F_{0.04+x}$ when the europium source is $EuF_3$; $Ca_{0.16}Sr_{0.82}AlSiN_3Eu_{0.02}:Cl_{0.04}F_x$ when the europium source is $EuCl_3$; and $Ca_{0.16}Sr_{0.82}AlSiN_3Eu_{0.02}:F_x$ when the europium source is $Eu_2O_3$;

Figure 8B:
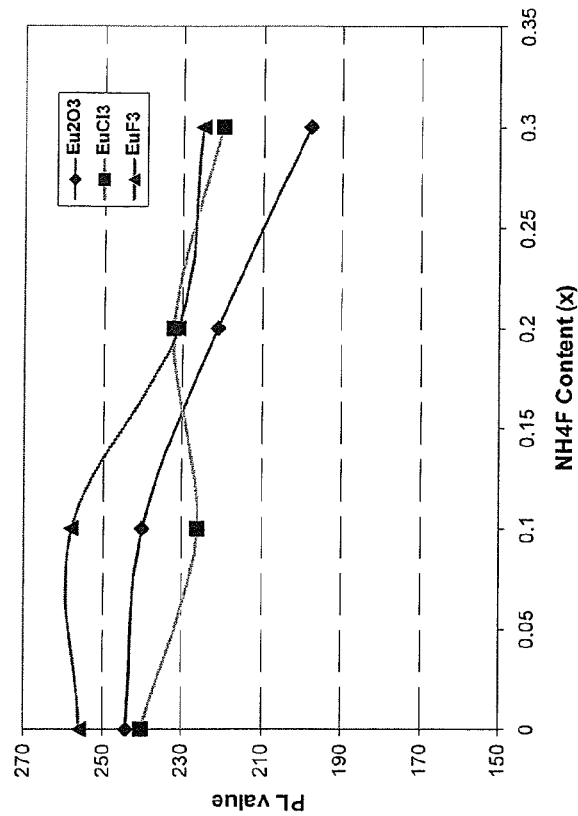
FIGS. 8A and 8B are graphs of the emission wavelength and photoluminescence (PL), respectively, of the changes that occur when the fluorine content x supplied by $NH_4Cl$ is increased above various halogen baseline levels; the three compounds being $Ca_{0.16}Sr_{0.82}AlSiN_3Eu_{0.02}:F_{0.04}Cl_x$ when the europium source is $EuF_3$; $Ca_{0.16}Sr_{0.82}AlSiN_3Eu_{0.02}$.
Figure 8A:
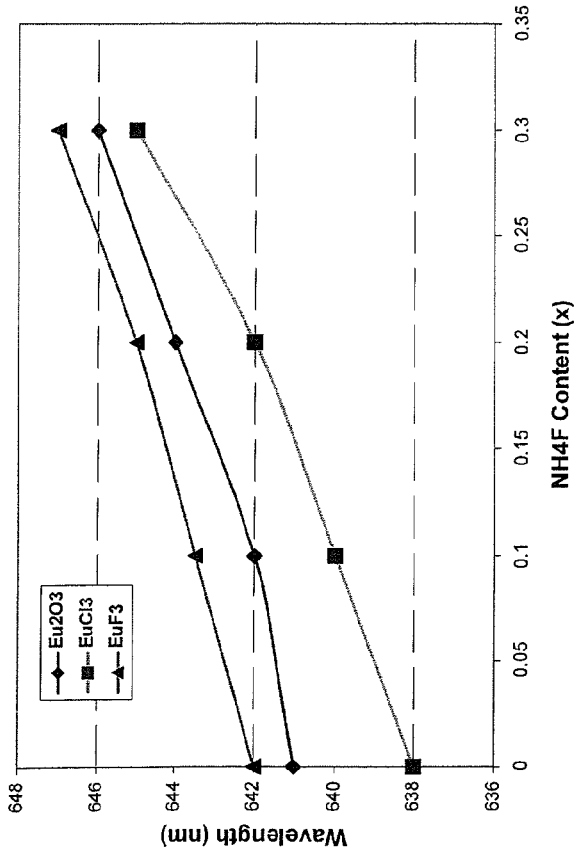
Figure 9B:
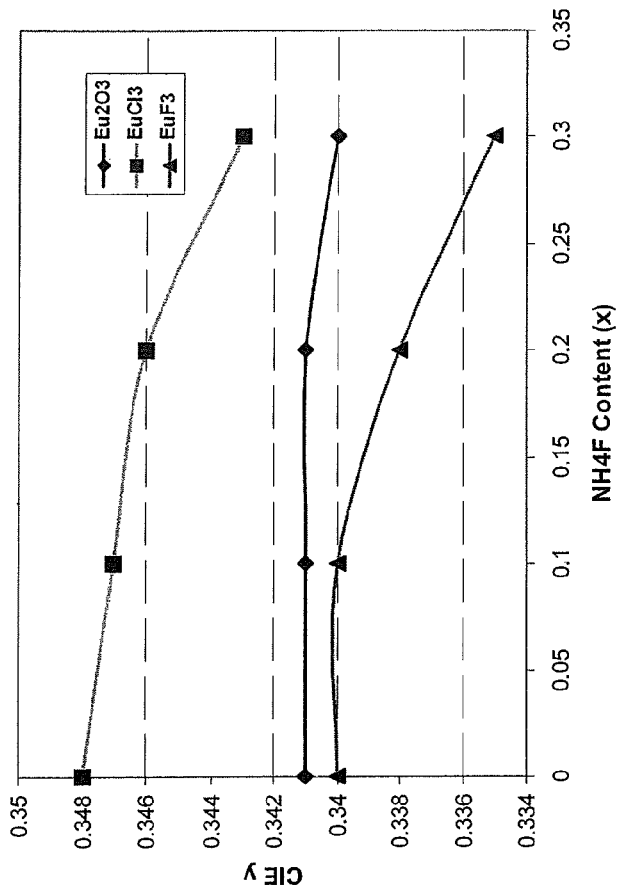
Figure 9A:
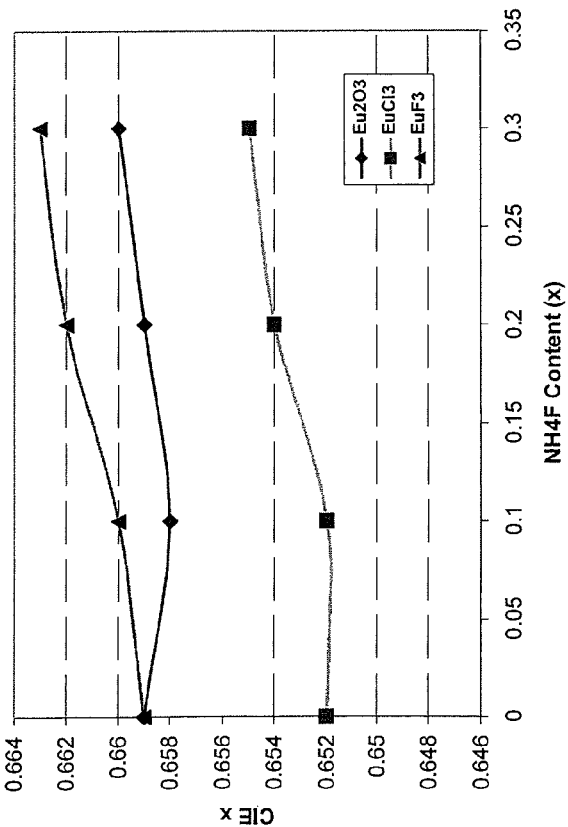
Figure 10A:
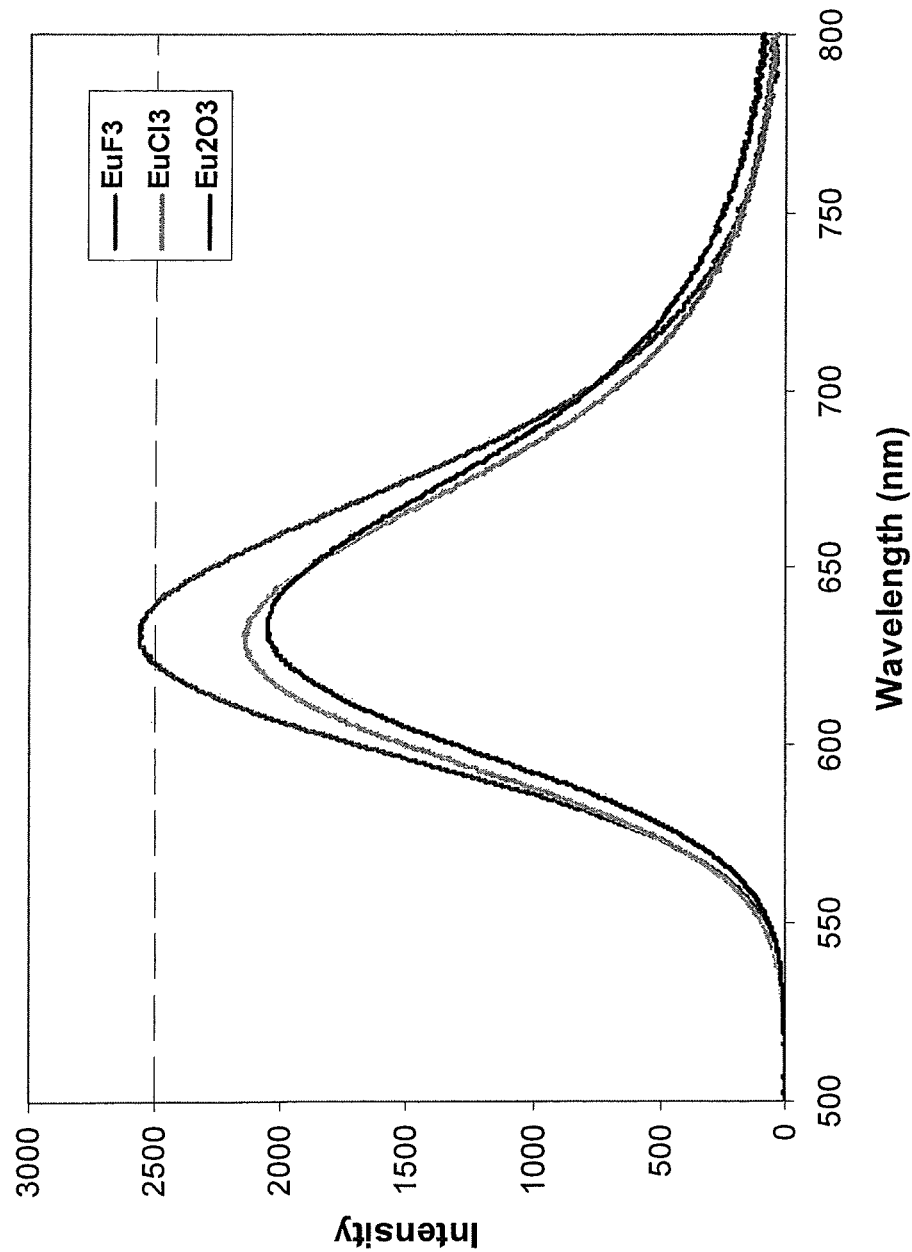
Figure 10B:
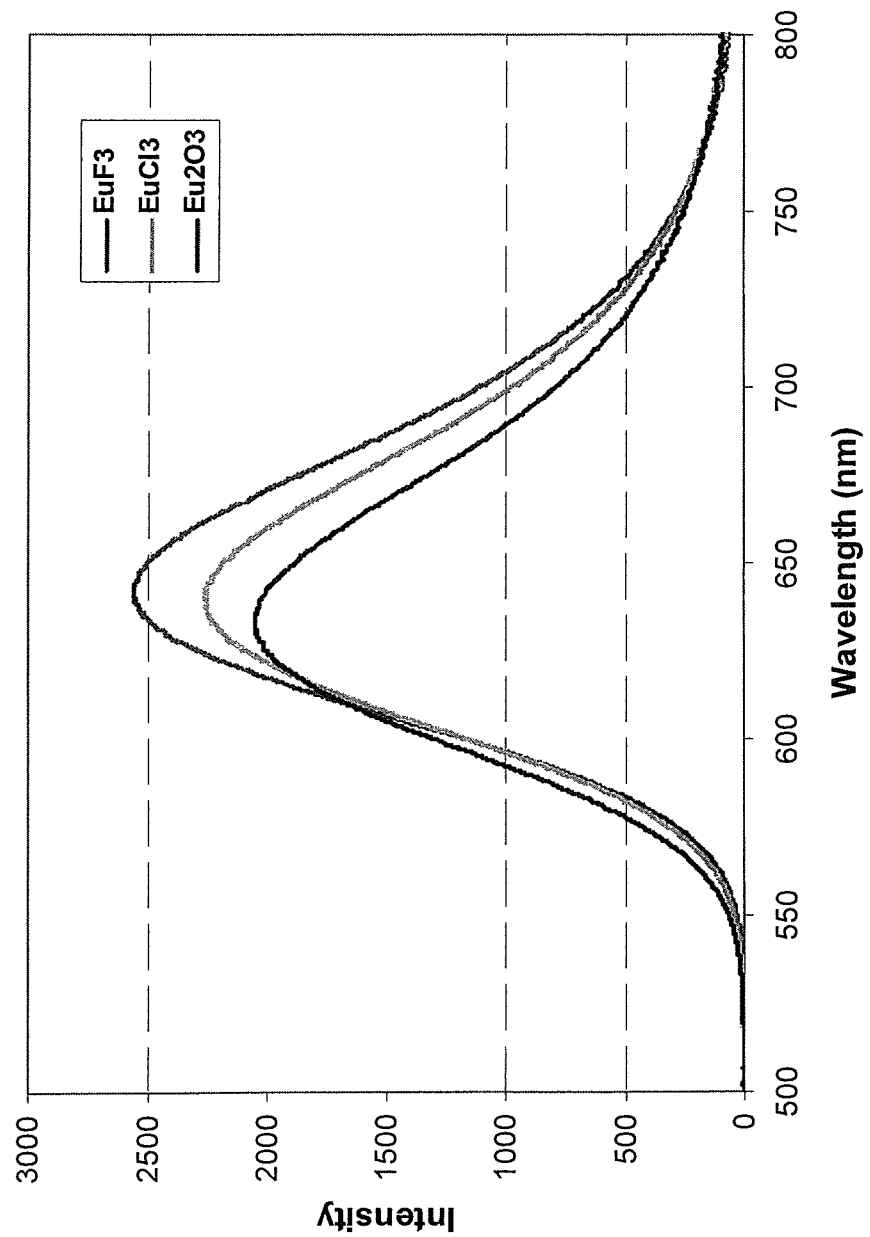
Figure 10C:
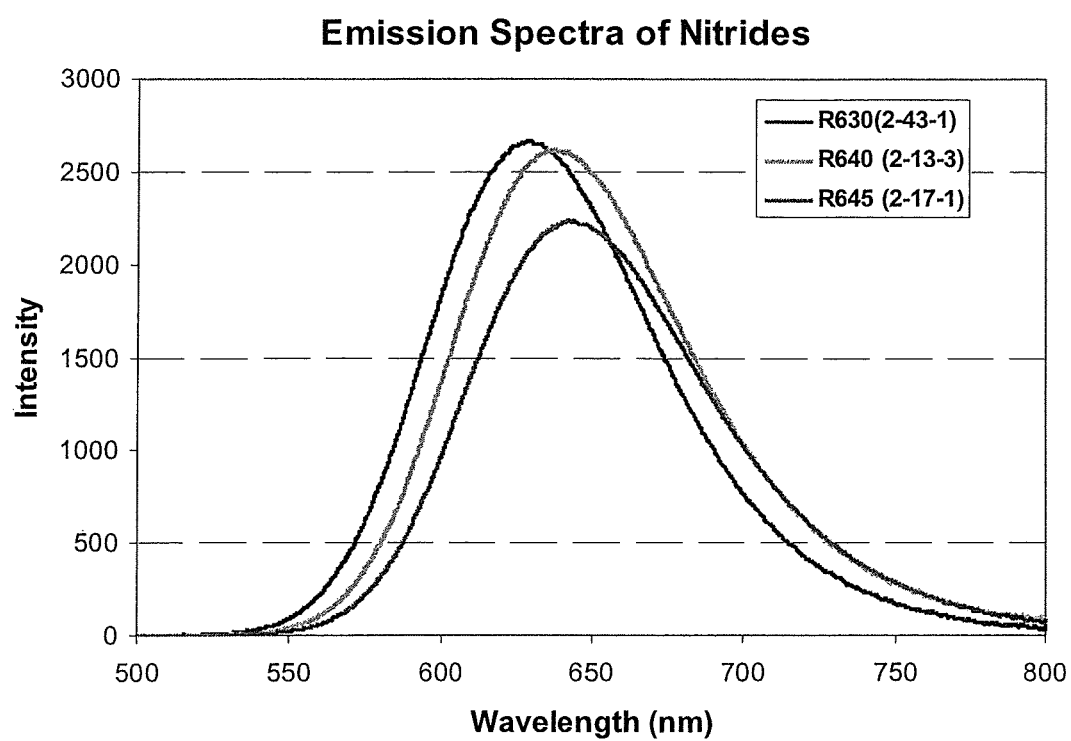
Figure 11A:
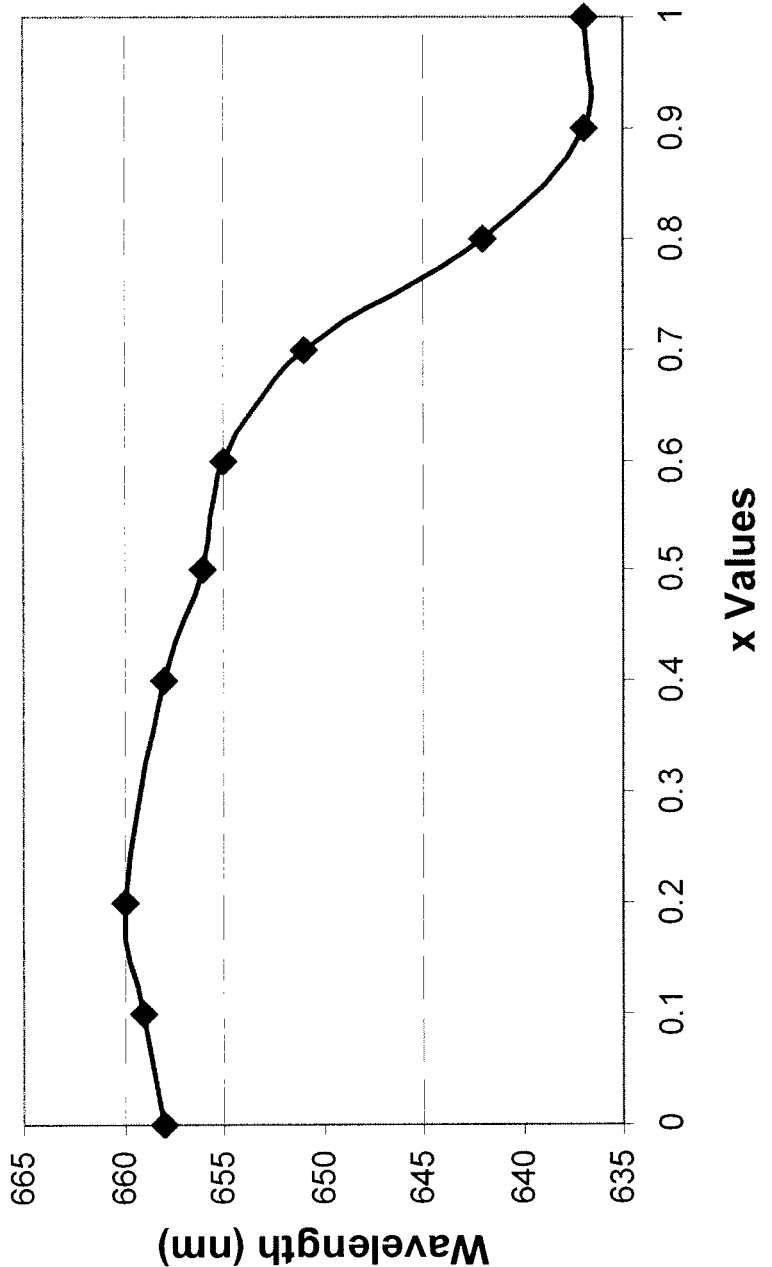
Figure 11B:
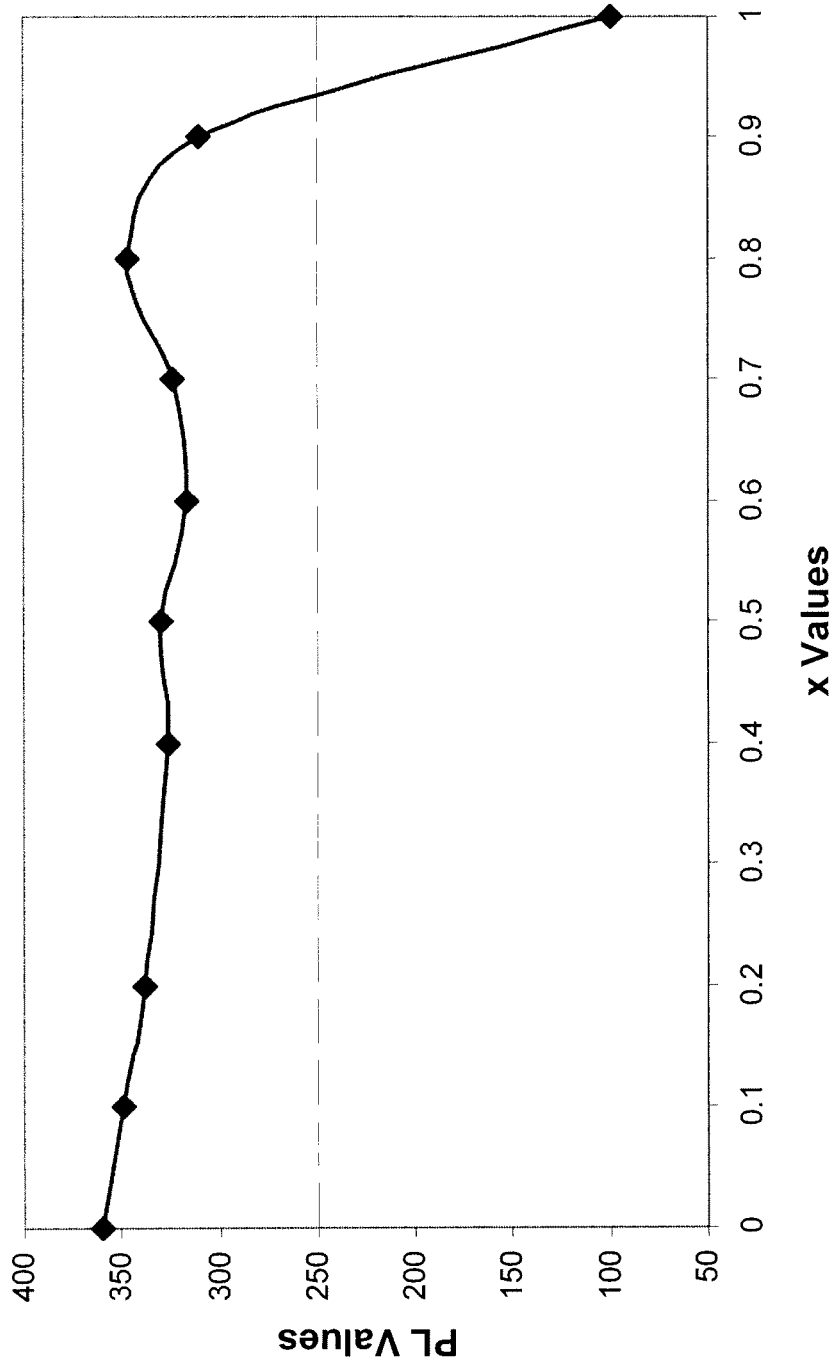
Figure 12A:
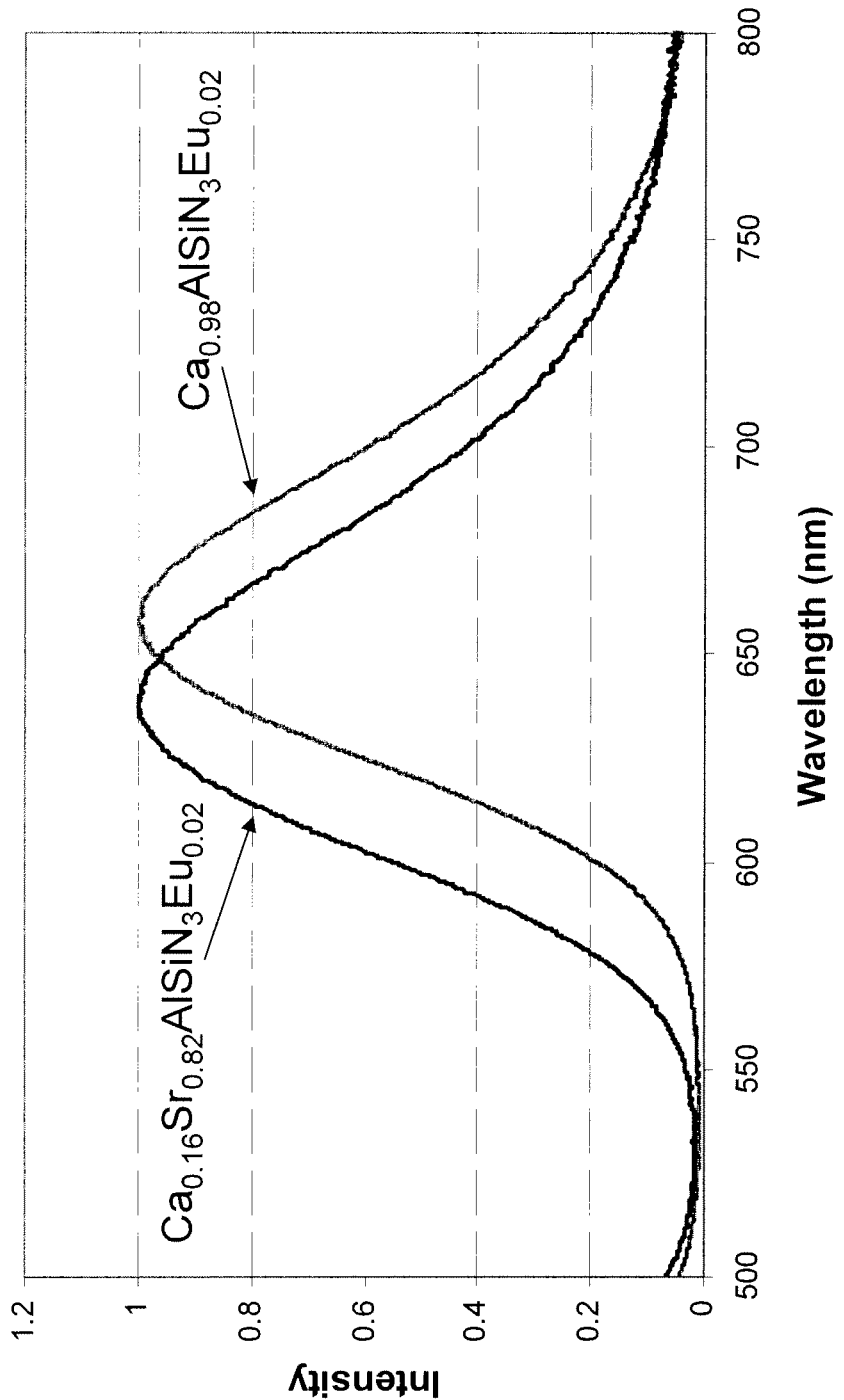
Figure 12B:
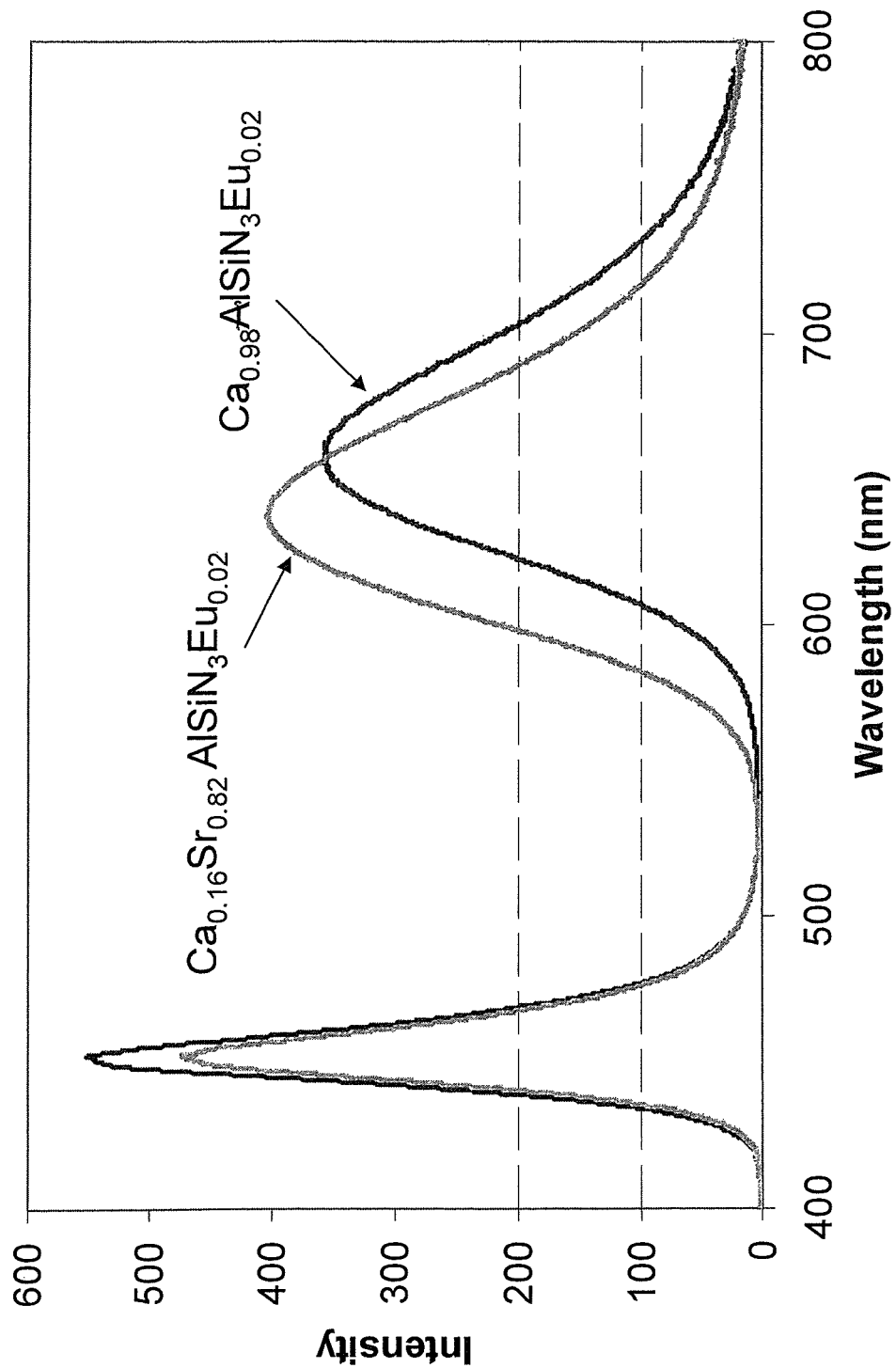
Figure 13:
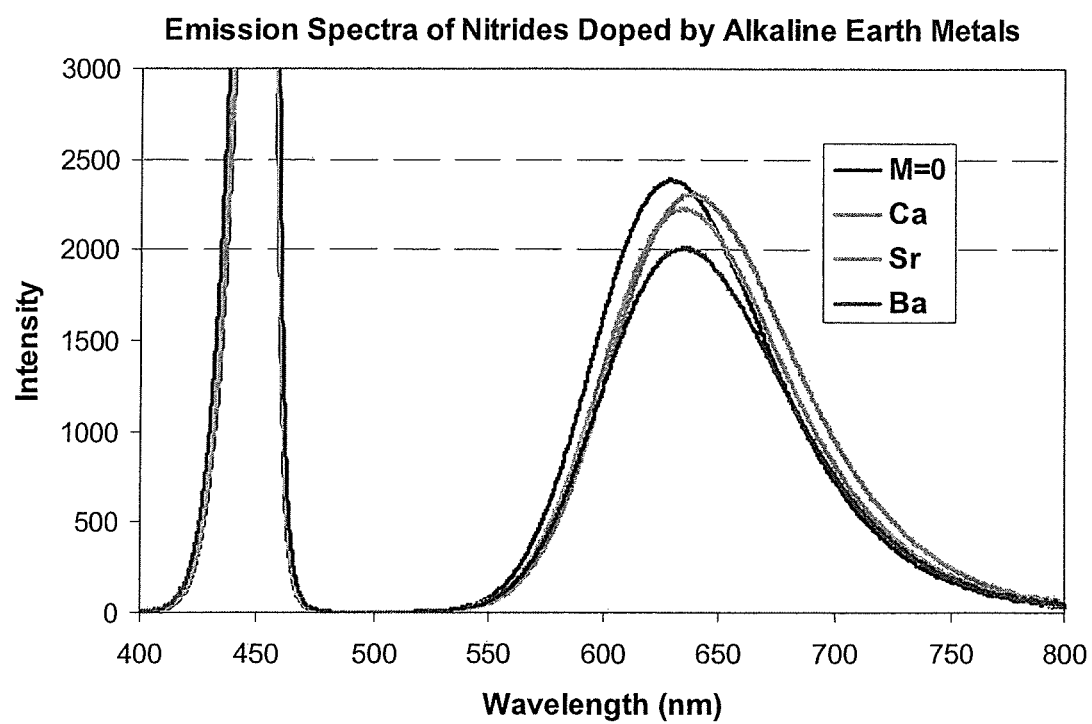
Figure 14A:
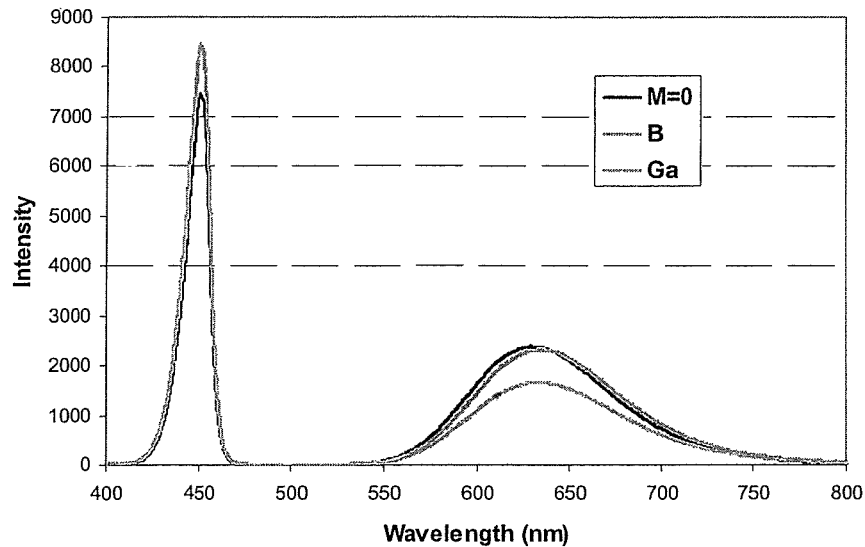
Figure 14B:
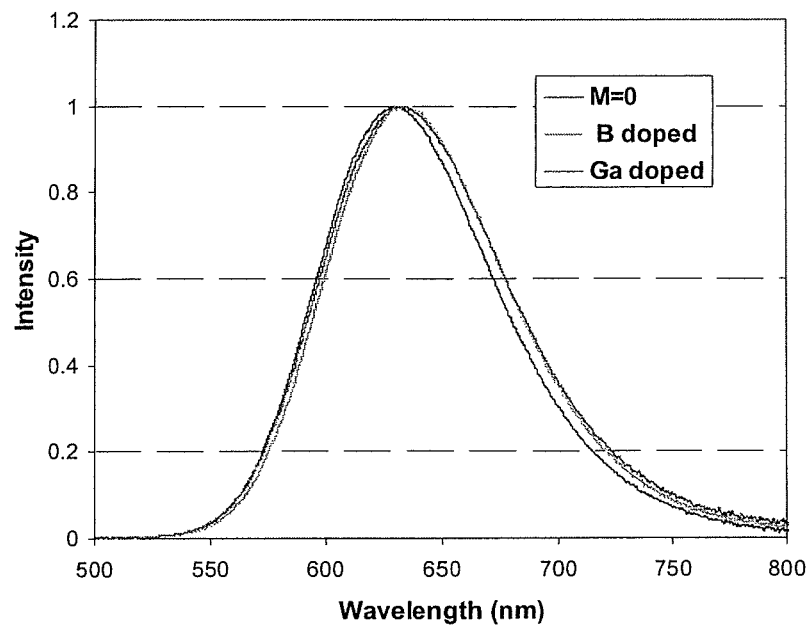
Figure 15A:
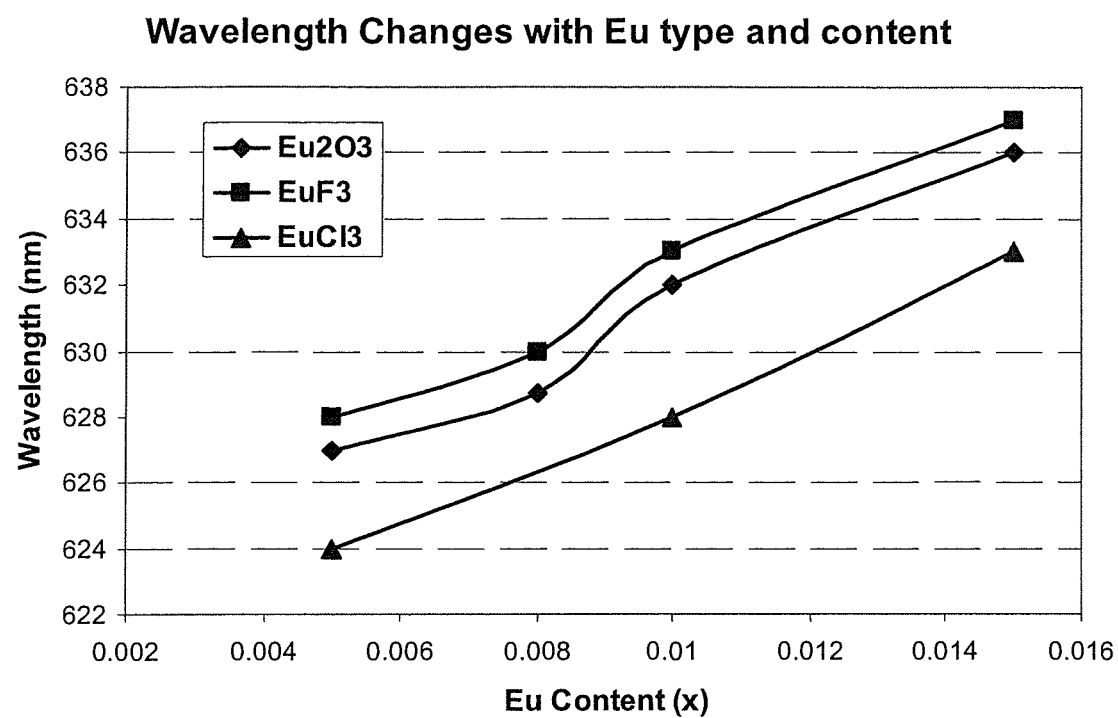
Figure 15B:
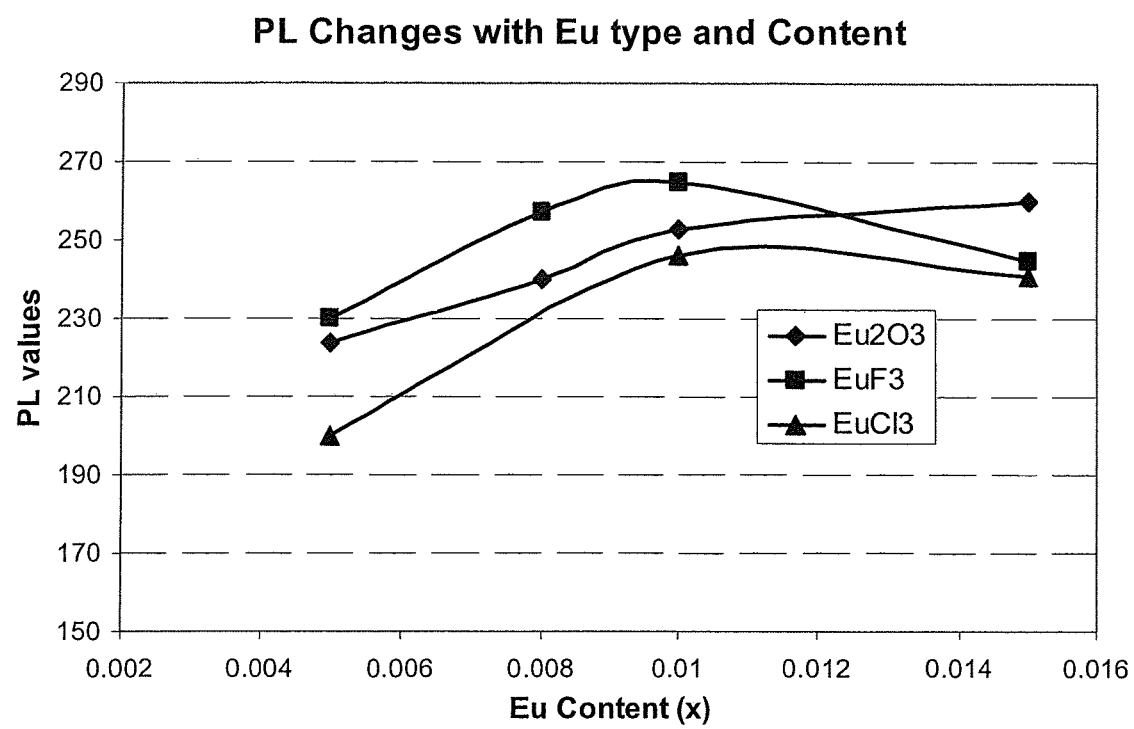
Figure 16:
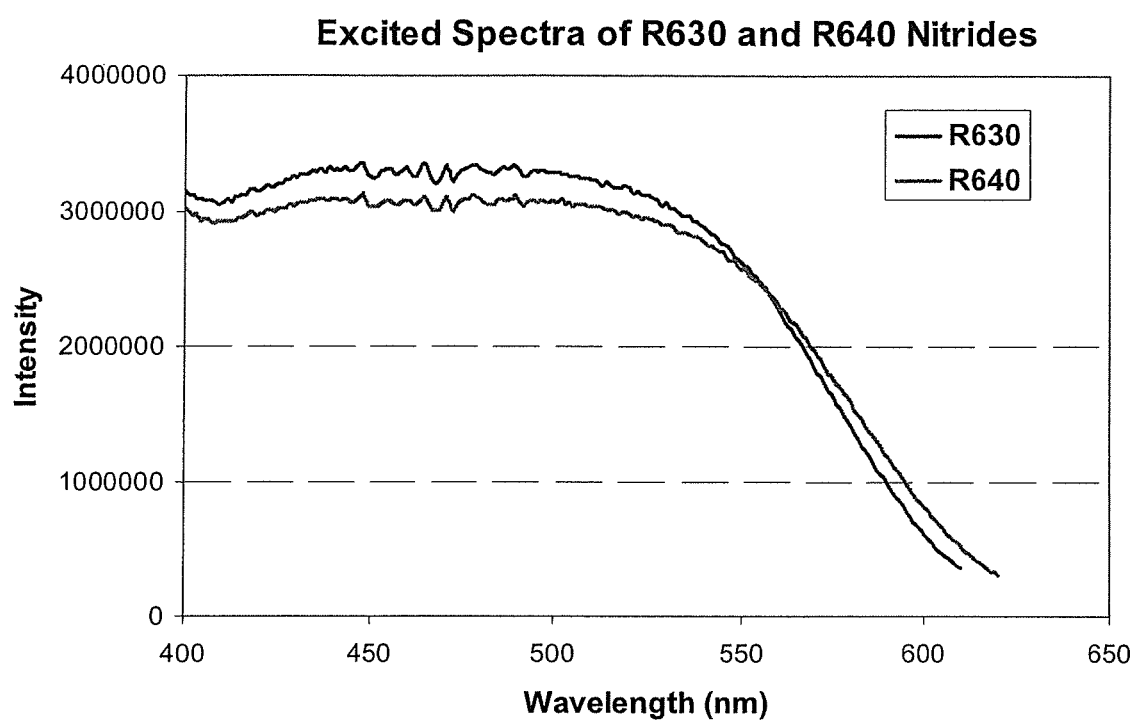
Figure 17:
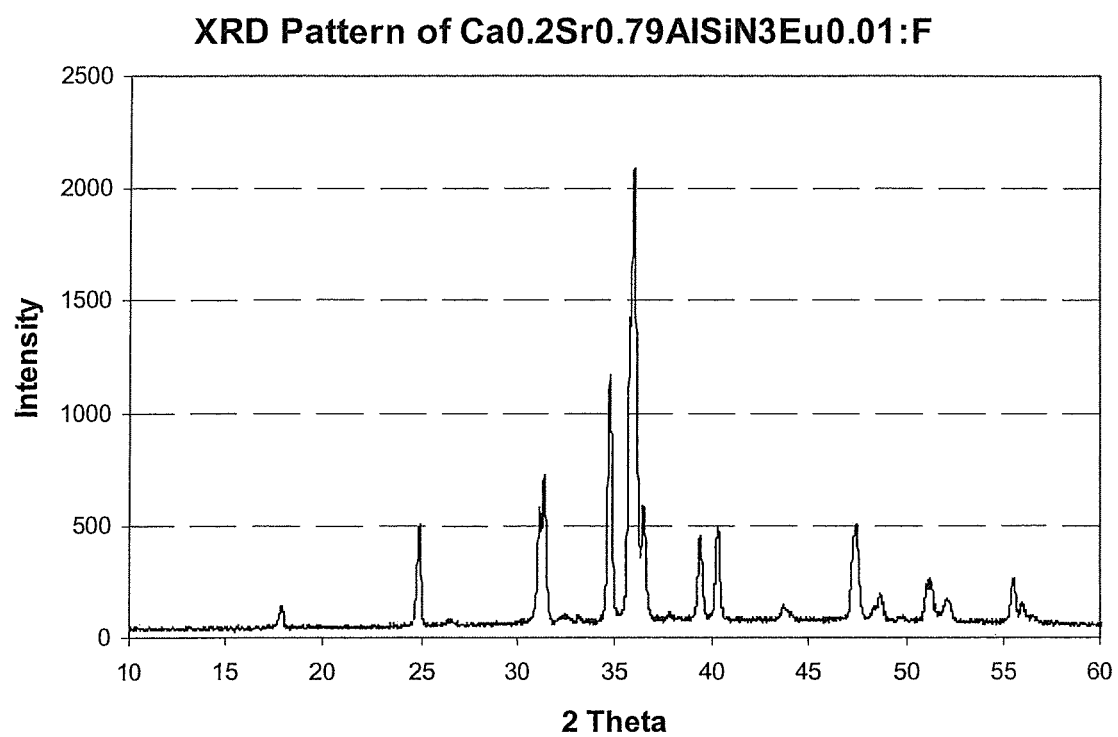

$Cl_{0.04+x}$ when the europium source is $EuCl_3$; and $Ca_{0.16}Sr_{0.82}AlSiN_3Eu_{0.02}:Cl_x$ when the europium source is $Eu_2O_3$;

FIGS. 9A and 9B are graphs showing the effects on the CIE coordinates x and y with the same additions of $NH_4F$ to the three compounds of FIGS. 8A and 8B;

FIGS. 10A and 10B are graphs of photoluminescence as a function of emission wavelength for both the R630 and R640 type of compounds, respectively, when no additional halogen is provided by a flux such as $NH_4F$ or $NH_4Cl$;

FIG. 10C is a collection of emission spectra comparing the R630 and R640 nitride-based red phosphors (the numbers in the designations indicating roughly the peak emission wavelength of that particular phosphor), having formulas $Ca_{0.2}Sr_{0.79}AlSiN_3Eu_{0.01}$ (R630), $Ca_{0.158}Sr_{0.815}AlSiN_3Eu_{0.023}$, (R640), to the phosphor $Ca_{0.157}Sr_{0.808}AlSiN_3Eu_{0.035}$ (R645), where $EuF_3$ was used as the source of europium in each of the three compositions;

FIGS. 11A-B are graphs of emission wavelength and photoluminescence as a function of Sr content for the phosphors having the formula $Ca_{0.98-x}Sr_xAlSiN_3Eu_{0.02}$, where $Eu_2O_3$ is the europium source;

FIGS. 12A-B are the normalized emission spectra of $Ca_{0.98-x}Sr_xAlSiN_3Eu_{0.02}$ and $Ca_{0.98-x}Sr_xAlSiN_3Eu_{0.02}$ with x=0.82 and x=0, respectively, plotted in this way to show the effect of a wavelength shift to shorter wavelengths with the Sr doping, and a greater brightness with Sr doping;

FIG. 13 shows the effect of doping the present nitride-based red phosphors with further amounts of an alkaline earth metal; specifically, Ca, Sr, and Ba replacing a portion of the Ca/Sr mix discussed in previous paragraphs: here the compound under study had the formula $Ca_{0.2}Sr_{0.74}AlSiM_{0.05}N_3Eu_{0.01}$, where M was Ca, Sr, Ba, respectively;

FIGS. 14A-B provide a collection of emission wavelengths, the raw data shown in FIG. 14A and a normalized version shown in FIG. 14B, for a nitride-based red phosphor with a 5% level of a group IIIA (of the periodic table) metal M, where M is in this example either boron or gallium;

FIGS. 15A-B are graphs showing peak emission wavelength and photoluminescent changes as a function of Eu source and content, where Eu sources include the oxide, fluoride, and chloride salts of the europium metal; the compound chosen for this study being $Ca_{0.2}Sr_{0.8-x}AlSiN_3Eu_x$, where x ranged from 0.005 to 0.015;

FIG. 16 is a collection of excitation spectra for the R630 composition having the formula $Ca_{0.2}Sr_{0.8}AlSiN_3Eu_{0.01}$, and the R640 composition having the formula $Ca_{0.158}Sr_{0.815}AlSiN_3EU_{0.023}$;

FIG. 17 is an x-ray diffraction (XRD) pattern of one of the typical compositions of the present embodiments; the particular compound examined was $Ca_{0.2}Sr_{0.79}AlSiN_3Eu_{0.01}:F$;

FIGS. 18A-18E are exemplary spectra of light intensity versus wavelength emitted by warm white luminescent systems.

DETAILED DESCRIPTION OF THE INVENTION

An introduction to the field of nitride-based, red emitting phosphors has been provided by K. Uheda et al. in "Luminescence properties of a red phosphor, $CaAlSiN_3:Eu^{2+}$, for white light-emitting diodes," published in *Electrochemical and Solid-State Letters*, 9 (4) H22-H25 (2006). This reference explains how white light-emitting diodes (LEDs) are attracting increasing attention due to their high efficiencies and long lifetimes. The earliest "white light LEDs," consisting of a blue LED as an excitation source and provider of blue light, and a yellow-emitting $YAG:Ce^{3+}$ phosphor, suffered from low color rendering because of the lack of a red component. An earlier attempt at providing the desired red component was made with an $Eu^{2+}$ activated alkaline earth sulfide, which had the advantage of being excitable by blue light, but which also suffered from the potential to be degraded by atmospheric moisture due to its hygroscopic nature. The next generation of red phosphors exhibited an improvement in properties: these materials were alkaline earth silicon nitrides such as $CaSiN_2:Eu^{2+}$ (present nomenclature="1-1-2," after the stoichiometric amounts of the Si and N, respectively) and $Ca_2Si_5N_8:Eu^{2+}$ ("2-5-8"), where, at least in the latter case, other alkaline earth metal elements may be substituted for Ca. The state of the art in red nitrides is the compound $CaAlSiN_3:Eu^{2+}$ ("1-1-1-3"), where again Ca can be any alkaline earth or mixture of alkaline earths. These compounds have greater chemical stability and optical efficiency than their 1-1-2 and 2-5-8 counterparts. K. Uheda et al. were the first to discover the benefits of the 1-1-1-3 compound as a phosphor, where interestingly, the host material $CaAlSiN_3$ was already known from the CaO, MN, and $Si_3N_4$ phase diagram.

An introduction to the field of nitride-based, red emitting phosphors has been provided by K. Uheda et al. in "Luminescence properties of a red phosphor, $CaAlSiN_3:Eu^{2+}$, for white light-emitting diodes," published in *Electrochemical and Solid-State Letters*, 9 (4) H22-H25 (2006). This reference explains how white light-emitting diodes (LEDs) are attracting increasing attention due to their high efficiencies and long lifetimes. The earliest "white light LEDs," consisting of a blue LED as an excitation source and provider of blue light, and a yellow-emitting $YAG:Ce^{3+}$ phosphor, suffered from low color rendering because of the lack of a red component. An earlier attempt at providing the desired red component was made with an $Eu^{2+}$ activated alkaline earth sulfide, which had the advantage of being excitable by blue light, but which also suffered from the potential to be degraded by atmospheric moisture due to its hygroscopic nature. The next generation of red phosphors exhibited an improvement in properties: these materials were alkaline earth silicon nitrides such as $CaSiN_2:Eu^{2+}$ (present nomenclature="1-1-2," after the stoichiometric amounts of the Si and N, respectively) and $Ca_2Si_5N_8:Eu^{2+}$ ("2-5-8"), where, at least in the latter case, other alkaline earth metal elements may be substituted for Ca. The state of the art in red nitrides is the compound $CaAlSiN_3:Eu^{2+}$ ("1-1-1-3"), where again Ca can be any alkaline earth or mixture of alkaline earths. These compounds have greater chemical stability and optical efficiency than their 1-1-2 and 2-5-8 counterparts. The host material $CaAlSiN_3$ was already known from the CaO, AlN, and $Si_3N_4$ phase diagram.

While the advent of new red nitrides was crucial to the evolution of the state of the art of backlighting and warm white light (specifically, their ability to impart a high color rendering to the product white light), their inclusion in a mix of light from other phosphors has be developing over a period of time. The assignee of the present application has been involved in this field for some time, and has contributed a number of innovations to the art. The following table lists several patents and published applications directed RGB systems, each patent (or published application) being incorporated herein in its entirety. Table 1 is provided for the purpose of summarizing the red and green phosphor compositions that have contributed to the present state of the art, and also to show the progression towards adoption of an $CaAlSiN_3:Eu^{2+}$-type compounds in the present art.

U.S. Pat. No. 7,311,858, titled "Silicate-based yellow-green phosphors," filed Sep. 22, 2004, discloses the combination of a blue LED, a green phosphor that includes (but is not limited to) compositions having the formula $M_2SiO_4$:$Eu^{2+}D$, where M is a divalent metal that includes the alkaline earths, and D is a dopant selected from the group consisting of F, Cl, Br, I, P, S, and N, and a red phosphor that includes (but is not limited to) the nitridosilicate $(Sr,Ba,Ca)_2Si_5N_8$:$Eu^{2+}$.

U.S. Pat. No. 7,575,679, titled "Silicate-based green phosphors,", filed Aug. 27, 2008, discloses the combination of a blue LED and the nitridosilicate $(SrBaCa)_2Si_5N_8$:$Eu^{2+}$ (among other compounds) as the red phosphor, but this patent discloses a slightly different green phosphor from that of the patent in the paragraph above. The green phosphors of U.S. Pat. No. 7,575,679 may be described by the formula $(Sr,M^{2+})_x(Si,P)(O,F,Cl)_{2+x}$:$Eu^{2+}$, where $M^{2+}$ again includes the alkaline earth metals. These green phosphors may be undoped; in other words, the amounts of P, F, and/or Cl in the phosphor may be zero.

U.S. Pat. No. 8,017,035, titled "Silicate-Based Yellow-Green Phosphors," issued Sep. 13, 2011, a Continuation-in-part of U.S. Pat. No. 7,311,858, discloses the combination of a blue LED and green phosphor having the formula $M_2SiO_4$:$Eu^{2+}D$ (where M is a divalent metal that includes the alkaline earths, and D is a dopant selected from the group consisting of F, Cl, Br, I, P, S, and N), as in U.S. Pat. No. 7,311,858, but the red phosphor of the RGB solution includes the aluminonitridosilicate $(Sr,Ba,Ca)AlSiN_3$:$Eu^{2+}$. The present embodiments are directed to a more thorough disclosure of the use of these aluminonitridosilicate-based red phosphors (which may also be called nitride-based red phosphors).

A further disclosure filed by the assignee of the present application contributing to the RGB art is U.S. application Ser. No. 12/250,400, titled "Nitride-based red phosphors," and filed Oct. 13, 2008, but based on a provisional U.S. Application No. 61/054,399, title "Nitridosilicate-based red phosphors," filed May 19, 2008. The yellow-green phosphors of these two disclosures were based on the general formula $M_2SiO_4$:$Eu^{2+}$, which may be undoped, and used in combination with the blue LED and red phosphors of the nitridosilicate-based family of the type $(Sr,Ba,Ca)AlSiN_3$:$Eu^{2+}$ discussed above.

white light illumination and backlighting applications will be presented with exemplary data.

Chemical Description of the Present Red Nitrides

There are several ways to describe the formula of the present phosphors. In one embodiment, the present phosphors have the form M-A-B-(N,D):Z, where M, A, and B are three cationic metals and/or semimetals with divalent, trivalent, and tetravalent valences, respectively; N is nitrogen (a trivalent element), and D is a monovalent halogen that along with the nitrogen contributes to the anionic charge balance. Thus, these compounds may be thought of as halogen-containing nitrides. The element Z is an activator in the host crystal, providing the photoluminescent centers. Z may be a rare earth or transition metal element.

The present nitride-based red phosphors may be described in a slightly different format, to emphasize the approximate ratios of the constituent elements. This formula takes the form $M_mM_aM_b(N,D)_n$:$Z_z$, where the stoichiometry of the constituent elements (m+z):a:b:n follows the general ratios 1:1:1:3, although deviations from these integer values are contemplated, and n may range from about 2.5 to about 3.5, endpoints inclusive. It is noted the formula shows that the activator Z substitutes for the divalent metal $M_a$, in the host crystal, and that the host material of the phosphor contains substantially no oxygen (or at least, less than about 2 percent by weight, according to the present embodiments).

Embodiments of the present invention are directed to nitride-based, red phosphors having the formula $M_aM_bM_c(N,D)_a$:$E_z$, where $M_a$ may be a single divalent element, or it may be a combination of two or more divalent elements (or two divalent elements used simultaneously). Divalent elements include elements from the second column of the periodic table, the alkaline earth metals. The two divalent metals may be, for example, Ca and Sr. In this formula, n may range from about 2.5 to about 3.5, endpoints inclusive, and charge compensation may be accomplished by a redistribution of cationic content, changes in numbers of vacancies, inclusion of impurities, and the like. In the present phosphors, $M_a$ may be

TABLE 1

| Case ID | Filing date | Green phosphor | Red phosphor |
| --- | --- | --- | --- |
| U.S. Pat. No. 7,311,858 | Sep. 22, 2004 | $M_2SiO_4$:$Eu^{2+}D$<br>M includes alkaline earths<br>D = F, Cl, Br, I, P, S, and N | Includes<br>(Sr, Ba, Ca)$_2Si_5N_8$:$Eu^{2+}$ |
| U.S. Pat. No. 7,575,697 | Nov. 8, 2005 | $(Sr, M^{2+})_x(Si, P)(O, F, Cl)_{2+x}$:$Eu^{2+}$<br>$M^{2+}$ includes alkaline earths<br>(can be undoped; the amounts<br>of P, F, Cl zero) | Includes<br>(Sr, Ba, Ca)$_2Si_5N_8$:$Eu^{2+}$ |
| U.S. Pub. 2008/0116786 | Dec. 24, 2007 | $M_2SiO_4$:$Eu^{2+}D$<br>M includes alkaline earths<br>D = F, Cl, Br, I, P, S, N and B | Includes<br>(Sr, Ba, Ca)AlSiN$_3$:$Eu^{2+}$ |
| U.S. application Ser. No. 61/054,399 | May 19, 2008 | $M_2SiO_4$:$Eu^{2+}$ | Includes |
| U.S. application Ser. No. 12/250,400 | Oct. 13, 2008 | M includes alkaline earths | (Sr, Ba, Ca)AlSiN$_3$:$Eu^{2+}$ |

The present disclosure will be divided into the following sections: first, a chemical description of the present red nitrides (stoichiometric formulas) will be given, followed by a description of the synthesis, focusing on the starting materials. The structure of the present nitride-based red phosphors will then be discussed in detail, although further reference to structure will be made later in the disclosure with experimental x-ray diffraction (XRD) data. Experimental data comprising wavelength and photoluminescent changes upon inclusion of halogen will be presented, and reference will be made to the lowering of the oxygen content as a result of halogen inclusion. Finally, the role the present red nitrides may play in a combination of at least two divalent alkaline earth metals selected from the group consisting of Mg, Ca, Sr, Ba; $M_b$ is a trivalent metal such as Al, Ga, Bi, Y, La, and Sm; and $M_c$ is a tetravalent element such as Si, Ge, P, and B; N is nitrogen, and D is a halogen such as F, Cl, or Br. The following description contains first a disclosure of how the starting materials containing the alkaline earth metals may be prepared, then a description of the process by which the present nitride-based phosphors may be prepared, and then concludes with testing results. The preparation of some of the starting materials appears to be novel, as the inventors do not believe that one of the, strontium nitride, is commercially available.

The present nitride-based red phosphors may be described in yet another manner, this format emphasizing the stiochiometric relationship between the amounts of the metals and halogen(s) present relative to the amount of nitrogen present in the nitride host. This representation has the form $M_m M_a M_b D_{3w} N_{[(2/3)(m+z)+a+(4/3)b-w]} Z_z$. The parameters m, a, b, w, and z fall within the following ranges: $0.01 \le m \le 1.5$; $0.01 \le a \le 1.5$; $0.01 \le b \le 1.5$; $0.0001 \le w \le 0.6$, and $0.0001 \le z \le 0.5$.

The metal $M_m$ may be an alkaline earth or otherwise divalent metal such as Be, Mg, Ca, Sr, Ba, Zn, Cd, and/or Hg. Different combinations are possible, and $M_m$ may be a single one of these elements, or a mixture of any or all of them. In one embodiment, the metal $M_m$ is Ca.

$M_a$ is a trivalent metal (or semimetal) such as B, Al, Ga, In, Y, Sc, P, As, La, Sm, Sb, and Bi. Again, different combinations and contents of these metals/semimetals are possible, and in one embodiment, the metal $M_a$ is Al.

$M_b$ is a tetravalent element such as C, Si, Ge, Sn, Ni, Hf, Mo, W, Cr, Pb, Ti, and Zr. In one embodiment, the tetravalent element $M_b$ is Si.

The element D is a halogen such as F, Cl, or Br in this nitride-based compound, and may be contained within the crystal in any of a number of configurations: for example, it may be present in a substitutional role (substituting for nitrogen) in the crystalline host; it may be present interstitially in the crystal, and/or perhaps within grain boundaries that separate crystalline grains, regions, and/or phases. The amount of the halogen may range from about zero to about 2 atomic percent. In other embodiments, the amount of the halogen ranges from about zero to about 0.2, 0.5, 1, and 5 atomic percent, respectively.

Z is an activator comprising at least one or more of the rare earth elements and/or transition metal elements, and include Eu, Ce, Mn, Tb, and Sm. In one embodiment the activator Z is europium. According to one embodiment of the present invention the activator is divalent, and substitutes for the divalent metal $M_m$ in the crystal. The relative amounts of the activator and the divalent metal $M_m$ may be described by the molar relationship $z/(m+z)$, which falls within the range of about 0.0001 to about 0.5. Keeping the amount of the activator within this range may substantially avoid the so-called quenching effect manifested by a decrease in emission intensity caused by an excessive concentration of the activator. The desired amount of the activator may change with the particular choice of activator.

Starting Materials for the Present Synthesis

Prior art starting materials have typically consisted of the nitrides and oxides of the metals. For example, to produce the phosphor $CaAlSiN_3:Eu^{2+}$ in U.S. Pat. No. 7,252,788, it is taught that the nitride starting materials for the calcium, aluminum, and silicon sources may be $Ca_3N_2$, AlN, and $Si_3N_4$, respectively. The source of the europium in this disclosure was the oxide $Eu_2O_3$. In contrast, the sources of the metals in the present phosphors may be at least in part the halides of the metals, and typical examples include MgF, CaF, SrF, BaF, AlF, GaF, BF, InF, and $(NH_4)_2SiF_6$. The europium may be supplied by either of the two fluorides $EuF_2$ and $EuF_3$. The use of halides of the divalent, trivalent, and tetravalent metals is not the only way to supply the halogen to the phosphor: an alternative method is to use a flux such as $NH_4F$ or LiF.

Specifically, compounds of the divalent metal $M_m$ appropriate as raw materials in the synthesis of the present phosphors include nitrides, oxides, and halides; e.g., $Mm_3N_2$, MmO, $MmD_2$, where again D is F, Cl, Br, and/or I. Analogous raw material compounds of the trivalent metal $M_a$ are MaN, $Ma_2O_3$, and $MaD_3$. The tetravalent metal starting compounds include $Mb_3N_4$, and $(NH_4)_2MbF_6$. Compounds of the halide anion D include $NH_4D$ and AeD, where Ae is an alkaline metal such as Li, Na, and $MD_2$, where Me is an alkaline earth metal such as Mg, Ca, etc.

Prior art references have disclosed the oxide of europium, $Eu_2O_3$, as the source of the europium activator, as this material is a readily available commercial compound. The present inventors have discovered, however, that the oxygen in this compound has a deleterious effect on the photoluminescent properties of the phosphor. One way of eliminating this problem is to use a europium source that does not contain oxygen, such as the substantially pure Eu metal, but this is a very expensive approach that is difficult to implement. One embodiment of the present invention is to use a Eu halide, such as $EuF_3$ and/or $EuCl_3$ as europium-containing starting materials. The present inventors have found that when a europium halide such as $EuF_3$ is used as the europium source, the emission efficiency of the phosphor increases, and the emission wavelength of the phosphor shifts to a longer wavelength. Thus one embodiment of the present invention is to use a europium compound $EuD_3$ (D=F, Cl, Br, I), and not $Eu_2O_3$, as the europium source. These concepts will be illustrated, and discussed more fully, in conjunction with the accompanying figures.

The strontium nitride starting material bay be synthesized by nitriding Sr metal under a nitrogen atmosphere at temperature of about 600-850° C. for about 5-12 hours. The resulting Sr nitride is pulverized in a glove box within an inert atmosphere, such as a nitrogen atmosphere. The chemical reaction used to prepare the Sr nitride starting material may be represented by the following equation:

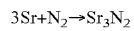
$$3Sr+N_2 \rightarrow Sr_3N_2$$

Ca nitride may be either obtained commercially or specially prepared. If it is desired to prepare one's own Ca nitride, then a similar procedure may be used as that described above to prepare strontium nitride: calcium metal is nitrided under a nitrogen atmosphere at temperature of about 600-950° C. for about 5-12 hours. Note that the upper temperature of the heating step is slightly higher in the Ca case than it was for the Sr case. The Ca nitride that is obtained from that step is pulverized in a glove box under an inert atmosphere such as a nitrogen atmosphere. The chemical reaction may be represented by the following equation:

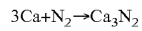
$$3Ca+N_2 \rightarrow Ca_3N_2$$

The synthesis process of the new phosphors containing two or more of the divalent element (such as Ca and Sr) is similar to that which was describe in co-pending application titled "Nitride-based red phosphors," filed Oct. 13, 2008, having application Ser. No. 12/250,400. Application Ser. No. 12/250, 400 is incorporated herein in its entirety. In the present case, the raw materials $Sr_3N_2$, $Ca_3N_2$, AlN, $Si_3N_4$, and the Eu-containing materials such as $EuF_3$, $EuCl_3$, $Eu_2O_3$, and/or their combinations, were sealed under an inert atmosphere such as nitrogen and the like. A glove box containing an inert atmosphere may be used. These raw materials are weighed, and then mixed using any of the methods known in the art, such as mixing with an ordinary ball mill.

The raw material mixture is then fired at an elevated temperature in an inert atmosphere; a convenient way to perform this firing step is to place the raw material mixture in a crucible, and then to place the crucible in a tube furnace. The raw material mixture within the crucible is heated to a temperature of about 1400-1700° C. using a heating rate of about 10° C. per minute, again, the entire procedure carried out in an inert atmosphere such as nitrogen or the like. Once at temperature, the mixture is maintained at 1400-1700° C. for about 2-10 hours to sinter the raw material mixture. After the sintering is complete, the sintered material is cooled to about room temperature, and then pulverized using any pulverizing means known in the art such as pulverizing with a mortar or ball mill. The pulverizing step produces a phosphor in powder form having the desired composition.

Structure of the Present Nitride-Based Red Phosphors

Aluminonitridosilicates may be derived from nitridosilicates by substitutions of aluminum for silicon. A red phosphor having the formula $CaAlSiN_3$ has been described by K. Uheda et al. in the reference alluded to earlier: "Luminescence properties of a red phosphor, $CaAlSiN_3:Eu^{2+}$, for white light-emitting diodes," in *Electrochemical and solid-state letters*, 9 (4) (2006), pages H22-H25. The crystal structure of the $CaAlSiN_3:Eu^{2+}$ family of compounds was found to be orthorhombic with a $Cmc2_1$ space group, where the unit cell volume expanded linearly with an increase in Eu concentration up to at least 20 mole percent. The structure is made up of tetrahedra of $[SiN_4]$ and $[AlN_4]$ forming corner sharing six-member rings; rings are combined to form sheets, of which there are two types, overlaid in an alternate fashion to form the three dimensional network. The $Ca^{2+}$ ions accommodated in cavities in the overlaid planes, and the $Eu^{2+}$ ions substitute for the $Ca^{2+}$ ions. The overlay of the two sheets, rotated 180 degrees one to the other, forms the basis for the existence of two types of nitrogen sites, which significance to the present embodiments will be made apparent from the next several paragraphs.

FIG. 2 of the Uheda et al. reference shows that in any one of the two sheets, either Sheet-A or Sheet-B as labeled in the figure, a nitrogen site at any particular vertex (corner) of either a $[SiN_4]$ or $[AlN_4]$ tetrahedron is shared by only one other tetrahedron (again, either $[SiN_4]$ or $[AlN_4]$ tetrahedra), when the two-dimensional sheets are viewed as separate structures. But when the two types of sheets are overlaid, and bonding between the sheets is considered, there is created a second type of nitrogen site in which that vertex is corner shared with two other tetrahedrons. The nature of the corner sharing is such that two thirds of the nitrogen sites are coordinated with three other Si/Al tetrahedron, and the remaining one third of the N sites are coordinated with two other Si/Al tetrahedron. Uheda et al. point out that this is to be contrasted with the nitridosilicate phosphor $CaSiN_2:Eu^{2+}$ described earlier, where all the N atoms are coordinated with only two Si tetrahedra. As a result, $CaAlSiN_3:Eu^{2+}$ has a more rigid structure than $CaSiN_2:Eu^{2+}$.

Determination of just where the halogen atoms are located in the present red nitrides, whether the halogen is a Cl, F atom, or combination of both Cl and F in the same phosphor, is best understood by considering the atomic arrangements of all the atoms within the $CaAlSiN_3$ crystal structure. This topic has been reviewed by R-J Xie et al. in "Silicon-based oxynitride and nitride phosphors for white LEDs—a review," published in *Science and Technology of Advanced Materials* 8 (2007), pp. 588-600. The atomic arrangements in the materials, particularly as they pertain to a halogen in a $CaAlSiN_3$ crystal, will be covered in the next several paragraphs of the present disclosure. CaAlSiN3 itself has an orthorhombic crystal structure having the space group $Cmc2_1$, and unit cell parameters of a=9.8007 Å, b=5.6497 Å, c=5.0627 Å.

The structure of the present $CaAlSiN_3$-based halogen-containing materials is built up corner sharing $SiN_4$ and $AlN_4$ tetrahedra, linked in two different ways: one third of the nitrogen atoms in so-called N2 sites are linked to two $SiN_4$ or $AlN_4$ tetrahedral neighbors, and the remaining two thirds of the nitrogen atoms in N3 sites are connected to three $SiN_4$ or $AlN_4$ tetrahedral neighbors. The $Si^{4+}$ and $Al^{3+}$ cations are randomly distributed within the tetrahedral sites formed by four nitrogen atoms. Tetrahedra display corner sharing to form vertex-linked M6N18 rings, where M represents the aluminum and silicon cations. The Ca atoms reside in the tunnels surrounded by six corner-sharing Al/Si occupied tetrahedral, and are coordinated to two to four nitrogen atoms, where the average Ca—N bond length is 2.451 Å.

Effects of Halogen Content on Optical Properties

That halides of europium may be used as the source of the europium has been taught by Hirosaki et al. (US 2007/0007494). Their disclosure states that: " . . . from the viewpoint of good reactivity with other nitride materials, oxides, nitrides, and halides of [europium] are preferred, and oxides are particular preferred since the raw materials are available at a low cost and the temperature for phosphor synthesis can be lowered. This patent application goes on to disclose that Eu halides such as $EuF_2$, $EuF_3$, $EuCl_2$, and $EuCl_3$ are [also] preferred since they have an effect of accelerating crystal growth. $Eu_2O_3$ is particularly preferred, because it is an inexpensive raw material, has a low degree of deliquescency, and enables a synthesis of a high-luminance phosphor at a relatively low temperature. The amounts of the halogen from this source that end up inside the crystal, if any, are not discussed, and certainly the benefits of such a halogen content (such as the potential to getter contaminant oxygen) are not given.

The effect of the halogen content in the family of $CaAlSiN_3$ phosphors on photoluminescence and chromaticity has not, to the present inventors' knowledge, been disclosed in the literature. In the ensuing discussion, photoemission intensity, peak emission wavelength, and the chromaticity parameters x and y were measured as a function of halogen content, this content providing a baseline level supplied by a halogenated europium source. A control was run for each experiment, for which the phosphor was synthesized using $Eu_2O_3$ as the europium source, and thus the control samples had no baseline halogen content. In each of the graphs of FIGS. 2-9 there are three curves, one for each of the three europium sources $Eu_2O_3$, $EuCl_3$, and $EuF_3$. Thus, the curve from the $Eu_2O_3$ synthesized phosphor has no baseline halogen; the curve from the $EuCl_3$ synthesized phosphor has a starting level of chlorine of x equal to about 0.04.

Additional halogen "x" (see formulas) was supplied in the form of $NH_4F$ (FIGS. 2, 3, 6, 7) or $NH_4Cl$ (FIGS. 4, 5, 8, 9), the halogen from this source being the independent variable in the experiment. It was increased from zero to about 0.3, stoichiometrically, to see what effect this had on the optical properties mentioned above. By this method, a particular red nitride of the present embodiments may contain both the halogens F and Cl in its composition, one or the other, or neither of each.

The first set of data (FIGS. 2-5) is for an exemplary phosphor having the formula $Ca_{0.2}Sr_{0.79}AlSiN_3Eu_{0.01}(F,Cl)_{0.04+x}$ when the europium source is $EuF_3$ and $EuCl_3$, respectively, and $Ca_{0.2}Sr_{0.79}AlSiN_3Eu_{0.01}(F,Cl)_x$ when the europium source ($Eu_2O_3$) provides no halogen. The phosphors in this family may collectively be designated R630 for their emission color (R=red) and wavelength (in nm). The second set of data (FIGS. 5-8) was generated by analogous experiments on the exemplary phosphors $Ca_{0.16}Sr_{0.82}AlSiN_3Eu_{0.02}(F,Cl)_{0.04+x}$ and $Ca_{0.16}Sr_{0.82}AlSiN_3Eu_{0.02}(F,Cl)_x$, again where the composition contains F if the europium source was $EuF_3$; Cl if the europium source was $EuCl_3$; and no halogen when the europium source was the oxide of europium ($Eu_2O_3$). The phosphors in this family may collectively be designated R640, again for their red emission color, this time centered at a wavelength of about 640 nm. The oxygen content of the R630 group of phosphors was about 1 weight percent, whereas that for the R640 family about 1.35 weight percent.

Figure 1B:
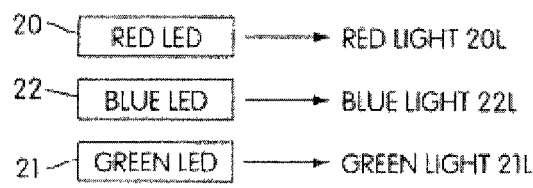
Figure 1B:
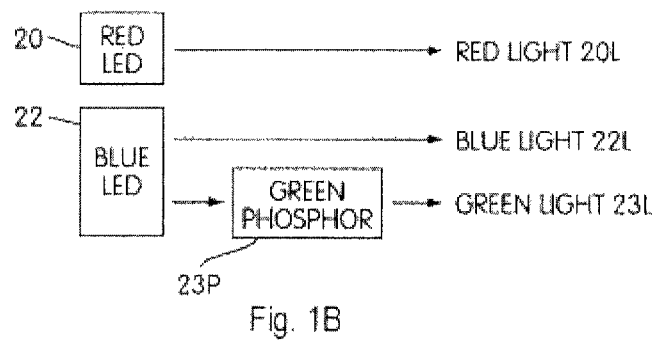
Figure 1C:
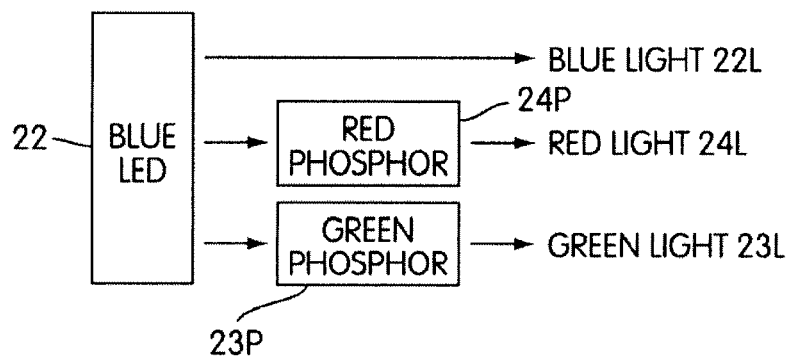
Figure 1D:
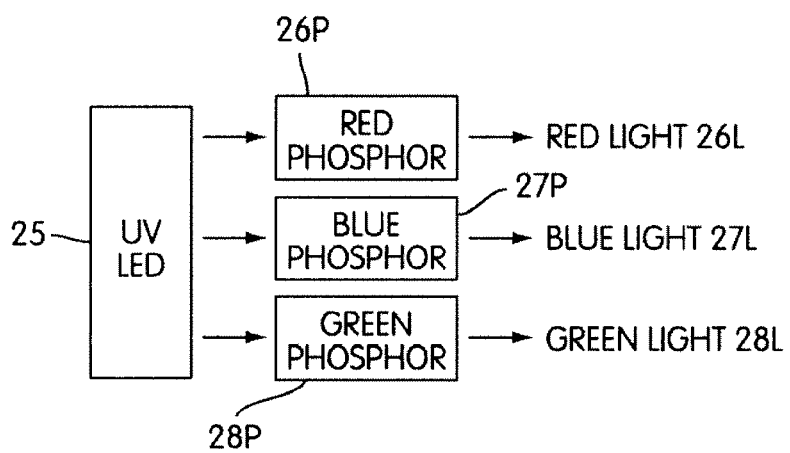
Figure 2B:
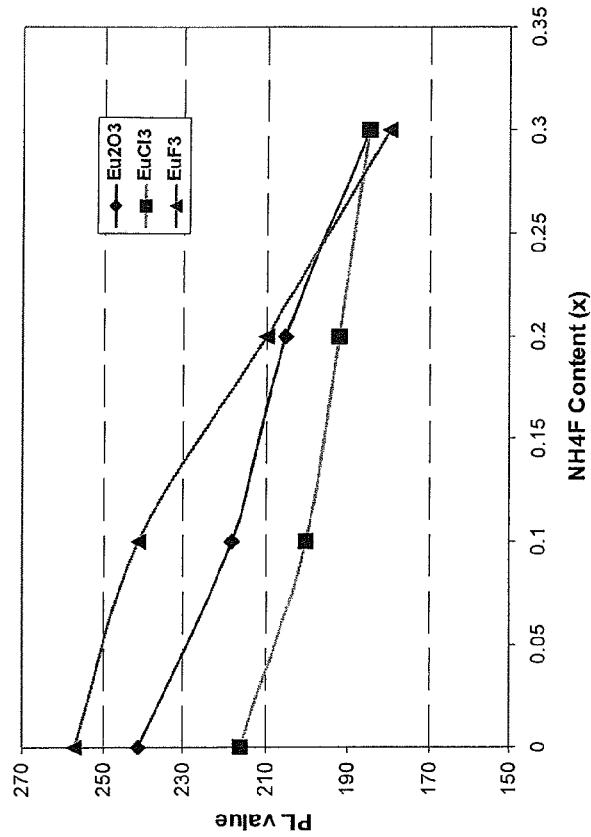
FIGS. 2A and 2B are graphs of the emission wavelength and photoluminescence (PL), respectively, of the changes that occur when the fluorine content x supplied by $NH_4F$ is increased above various halogen baseline levels; the three compounds being $Ca_{0.2}Sr_{0.79}AlSiN_3Eu_{0.01}:F_{0.04+x}$ when the europium source is $EuF_3$; $Ca_{0.2}Sr_{0.79}AlSiN_3Eu_{0.01}:Cl_{0.04}F_x$ when the europium source is $EuCl_3$; and $Ca_{0.2}Sr_{0.79}AlSiN_3Eu_{0.01}:F_x$ when the europium source is $Eu_2O_3$.
Figure 2A:
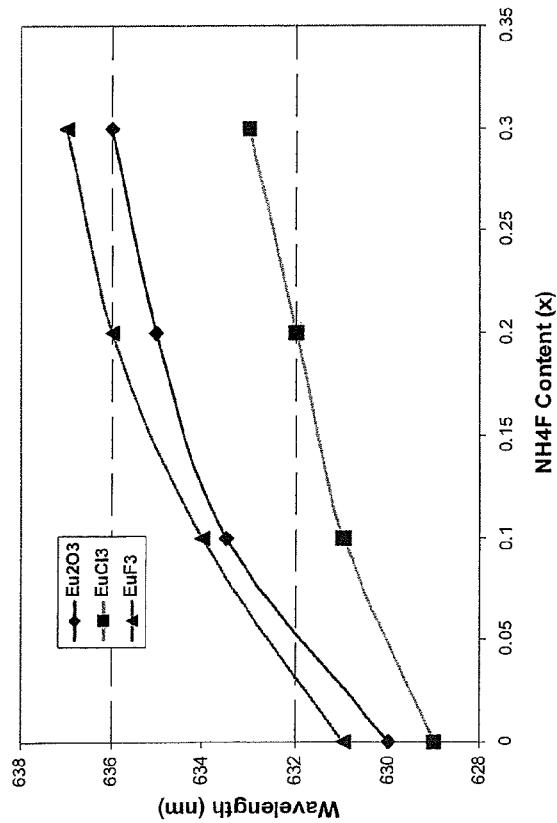

FIGS. 2A and 2B are graphs of the emission wavelength and photoluminescence (PL), respectively, of the changes that occur when the fluorine content x supplied by $NH_4F$ is increased above various halogen baseline levels; the three R30 compounds being $Ca_{0.2}Sr_{0.79}AlSiN_3Eu_{0.01}:F_{0.04+x}$ when the europium source is $EuF_3$; $Ca_{0.2}Sr_{0.79}AlSiN_3Eu_{0.01}:Cl_{0.04}F_x$ when the europium source is $EuCl_3$; and $Ca_{0.2}Sr_{0.79}AlSiN_3Eu_{0.01}:F_x$ when the europium source is $Eu_2O_3$. It may been seen that for this particular set of compounds, emission wavelength increased as more and more fluorine was added from the $NH_4F$ source, and thus the emission became more red in color. This property is viewed as being especially beneficial when the user is attempting to engineer phosphors having a desired chromaticity with particular color rendering properties. The effect of an increase in wavelength with additional halogen is the same no matter what the nature of the baseline halogen: F, Cl, or no initial halogen in the case of the control ($Eu_2O_3$). This beneficial effect comes at the expense of a slight loss of photoluminescent intensity (PL decreases as additional halogen above the baseline is incorporated into the crystal), although it is noted that this decrease is not substantial, and many situations are contemplated where it is well worth tolerating in order to achieve the desired chromaticity and color rendering.

Figure 3B:
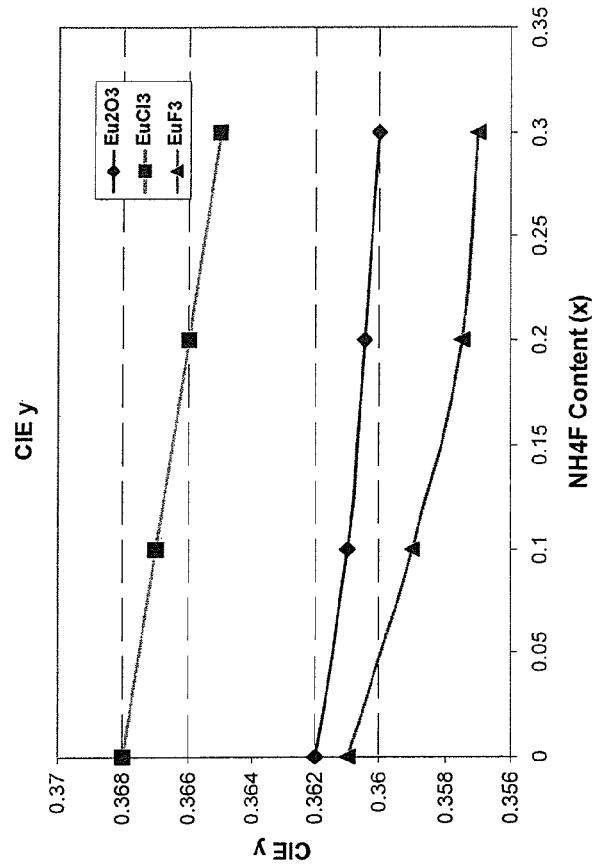
FIGS. 3A and 3B are graphs showing the effects on the CIE coordinates x and y with the same additions of $NH_4F$ to the three compounds of FIGS. 2A and 2B.
Figure 3A:
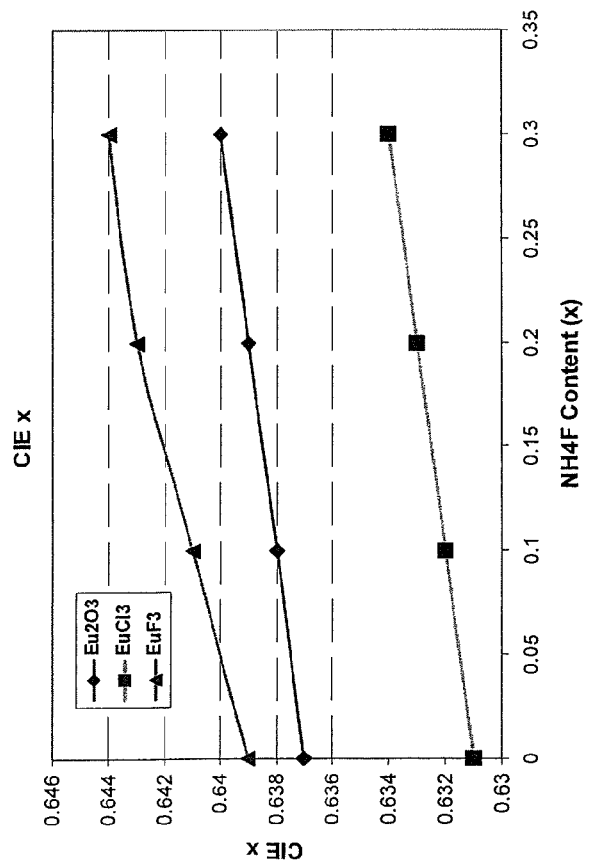

FIGS. 3A and 3B are graphs showing the effects on the CIE coordinates x and y with the same additions of $NH_4F$ to the same three compounds as in FIGS. 2A and 2B. Because of the importance the present embodiments has on chromaticity, it is viewed appropriate to provide a short discussion of what is meant by chromaticity, and the implications of that property on other issues affecting optical performance, such as color temperature and color rendering.

As described by K. Narisada et al. in "Color Vision," Chapter 17, Section One of the *Phosphor Handbook* (CRC Press, New York, 1999), pp. 799-818, the CIE colorimetric system is derived from three imaginary reference color stimuli (called tristimulus values), generated by comparing a reference (monochromatic wavelength) color with a test color made by the mixing of three primary colors. Test light source colors are specified from the tristimulus values, and used to define the chromaticity coordinates x and y of the light sources. A plot of the x and y coordinates of every color designated by the Intersociety Color Council-National Bureau of Standard (ISCC-NBS) is called the CIE chromaticity diagram, shown in the Phosphor Handbook at page 809.

K. Narisada et al. further teach the concept of chromatic adaptation, the function of vision that minimizes the influence of the (variable) color of the illumination on the perception of the object being illuminated. Variable color illumination means that the chromaticity coordinates of the light illuminating the object do not always correspond to the perceived colors. One method (proposed by the CIE) of correcting for this lack of correspondence is to objectively define the color of light by "color temperature," the absolute temperature of a black body radiator radiating light with a color the same as the light source. The color of the light source changes from a reddish to a bluish color as the color temperature increases. The "correlated color temperature" is the absolute temperature of a black body radiator closest to the light source when the chromaticity coordinates of the light source do not precisely match the radiator.

A final property of color vision useful in describing the present nitride-based red phosphors is color rendering, a property of the light source that changes the colors of the object illuminated by that source. The "color rendering index," represented by the parameter $R_a$, indicates the extent of the color rendering properties of a light source. It is calculated by taking the average of the differences in distance between chromaticity points of the sample and the reference light source for eight different selected object colors. The maximum value of $R_a$ is 100, which means there is no difference between sample and reference source for any of the eight selected colors.

The color temperature and color rendering index values of exemplary nitride-based phosphors of the present embodiments will be discussed later in a section addressing white light illumination, but the effects of halogen addition the CIE coordinates x and y will be addressed at this time. FIGS. 3A and 3B are graphs showing the effects on the CIE coordinates x and y (respectively) with the same additions of halogen from NH4F to the same three compounds as in FIGS. 2A and 2B. It will be observed that the x coordinate increases, and the y coordinate decreases, confirming the shift to longer wavelengths and a deeper red color when viewing the CIE chromaticity diagram of the Phosphor Handbook.

Figure 4B:
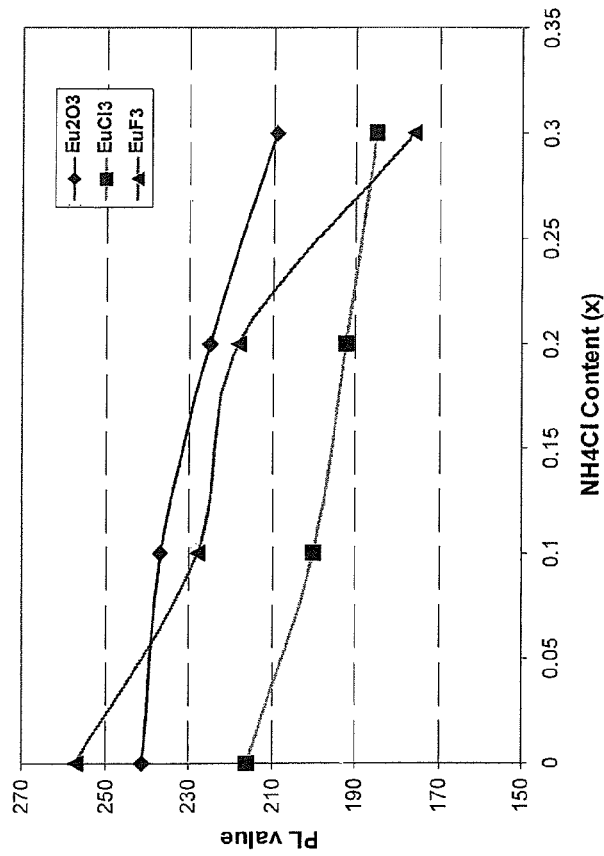
FIGS. 4A and 4B are graphs of the emission wavelength and photoluminescence (PL), respectively, of the changes that occur when the chlorine content x supplied by $NH_4Cl$ is increased above various halogen baseline levels; the three compounds being $Ca_{0.2}Sr_{0.79}AlSiN_3Eu_{0.01}:F_{0.04}Cl_x$ when the europium source is $EuF_3$; $Ca_{0.2}Sr_{0.79}AlSiN_3Eu_{0.01}:Cl_{0.04}+x$ when the europium source is $EuCl_3$; and $Ca_{0.2}Sr_{0.79}AlSiN_3Eu_{0.01}:Cl_x$ when the europium source is $Eu_2O_3$.
Figure 4A:
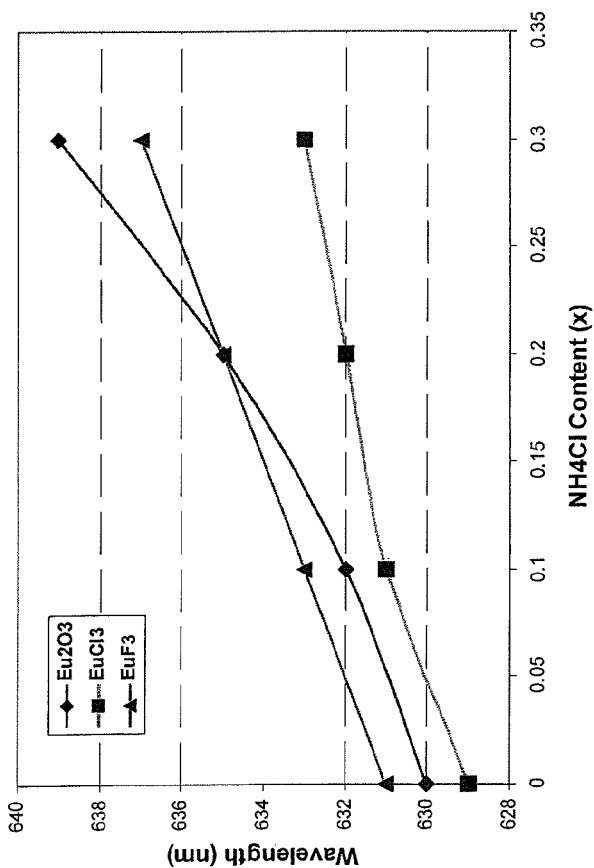

FIGS. 4A and 4B are graphs of the emission wavelength and photoluminescence (PL), respectively, of the changes that occur when the chlorine content x supplied by $NH_4Cl$ is increased above various halogen baseline levels; the three compounds being $Ca_{0.2}Sr_{0.79}AlSiN_3Eu_{0.01}:F_{0.04}Cl_x$ when the europium source is $EuF_3$; $Ca_{0.2}Sr_{0.79}AlSiN_3Eu_{0.01}:Cl_{0.04+x}$ when the europium source is $EuCl_3$; and $Ca_{0.2}Sr_{0.79}AlSiN_3Eu_{0.01}:Cl_x$ when the europium source is $Eu_2O_3$. The trends are the same as those for FIGS. 2A and 2B; that is to say, emission wavelength increased as more and more fluorine was added from the $NH_4F$ source, and thus the emission became more red in color.

Figure 5B:
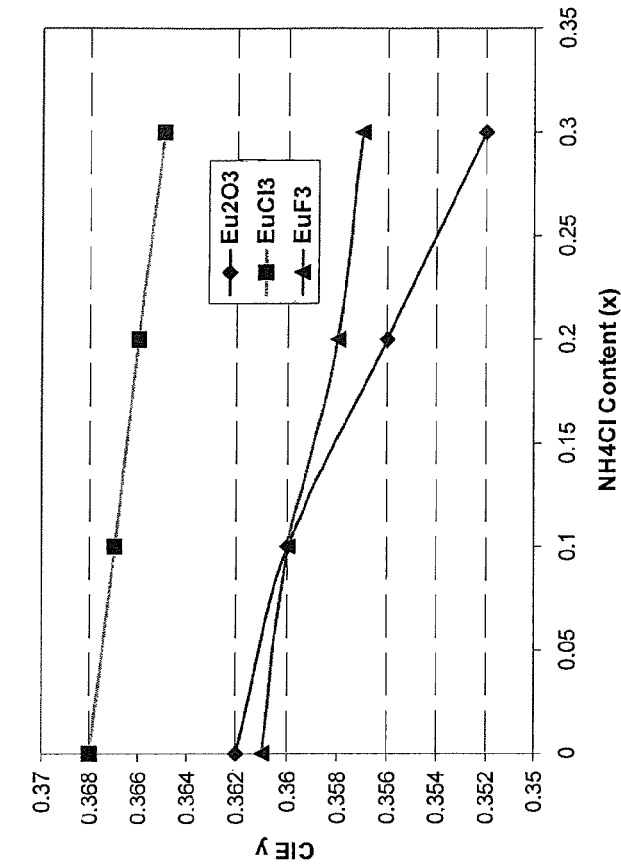
FIGS. 5A and 5B are graphs showing the effects on the CIE coordinates x and y with the same additions of $NH_4F$ to the three compounds of FIGS. 4A and 4B.
Figure 5A:
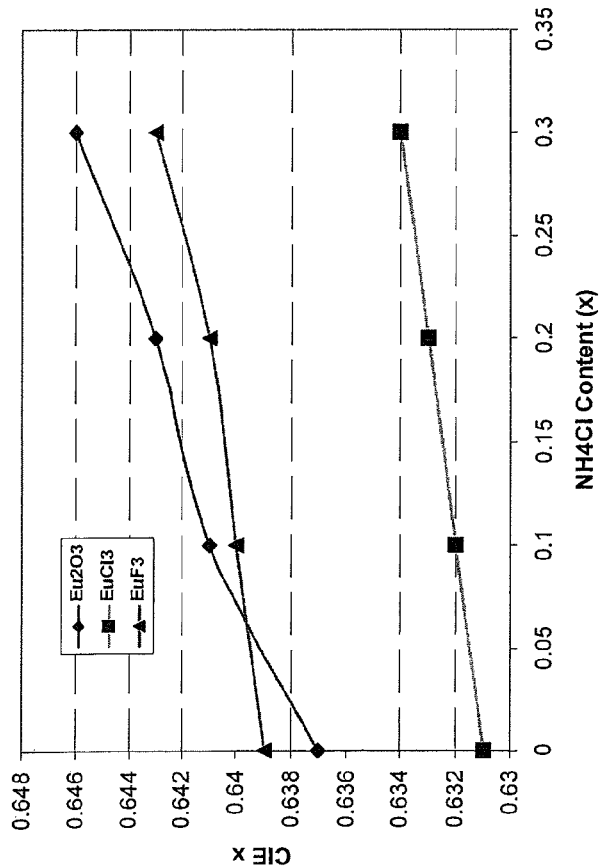
Figures 7A, 7B:
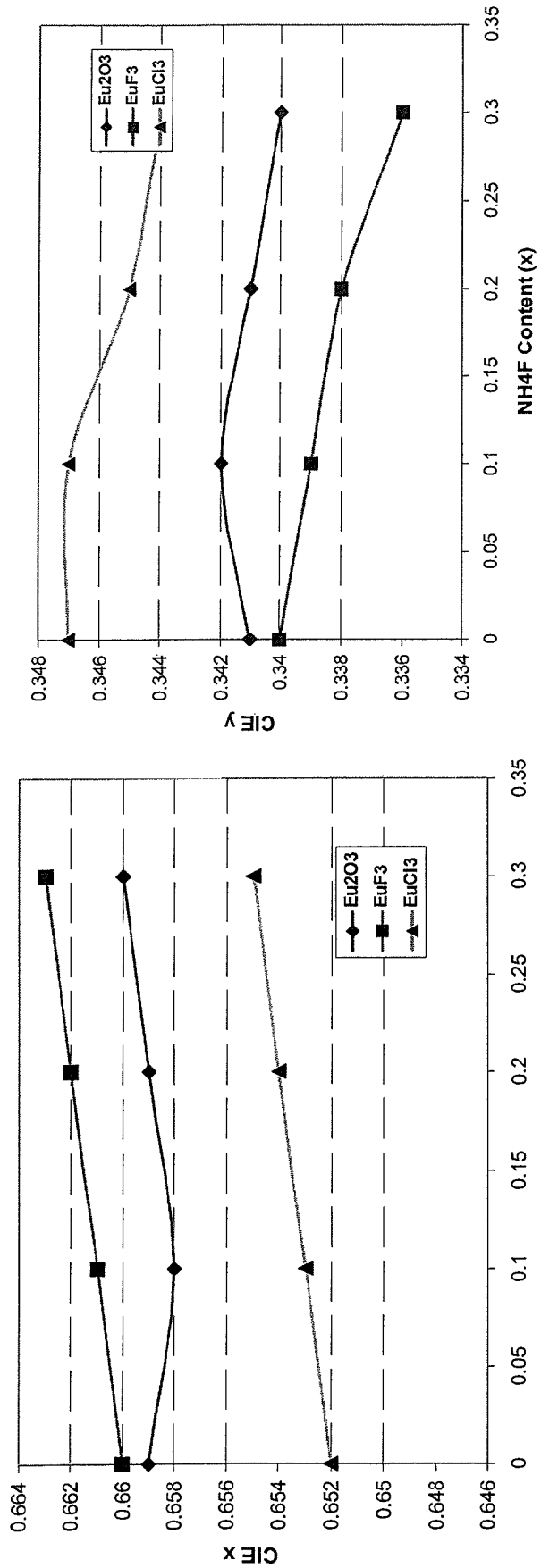
FIGS. 7A and 7B are graphs showing the effects on the CIE coordinates x and y with the same additions of $NH_4F$ to the three compounds of FIGS. 6A and 6B.

FIGS. 5A and 5B are graphs showing the effects on the CIE coordinates x and y (respectively) with the same additions of halogen from $NH_4Cl$ to the same three compounds as in FIGS. 4A and 4B. It will be observed that, as in the case with the R630 compounds for which $NH_4F$ was added, the x coordinate increases, and they y coordinate decreases, confirming the shift to longer wavelengths and a deeper red color when viewing the CIE chromaticity diagram.

An analogous set of experiments was carried out with a family of R640 compounds; these results are shown in FIGS. 6-9. FIGS. 6A and 6B are graphs of the emission wavelength and photoluminescence (PL), respectively, of the changes that occur when the fluorine content x supplied by $NH_4F$ is increased above various halogen baseline levels; the three compounds being $Ca_{0.16}Sr_{0.82}AlSiN_3Eu_{0.02}:F_{0.04+x}$ when the europium source is $EuF_3$; $Ca_{0.16}Sr_{0.82}AlSiN_3Eu_{0.02}:Cl_{0.04}F_x$ when the europium source is $EuCl_3$; and $Ca_{0.16}Sr_{0.82}AlSiN_3Eu_{0.02}:F_x$ when the europium source is $Eu_2O_3$. It may been seen that for this particular set of compounds, emission wavelength again increases as more fluorine is added from the $NH_4F$ source, and thus the emission becomes more red in color. The photoluminescence graph shows that photoluminescence is not affected as adversely as it was in the case of the R630 compound. CIE changes for those compounds are shown in FIGS. 7A and 7B.

FIGS. 8A and 8B are of the emission wavelength and photoluminescence (PL), respectively, of the changes that occur when the chlorine content x supplied by $NH_4Cl$ is increased above various halogen baseline levels; the three compounds being $Ca_{0.16}Sr_{0.82}AlSiN_3Eu_{0.02}:F_{0.04}Cl_x$ when the europium source is $EuF_3$; $Ca_{0.16}Sr_{0.82}AlSiN_3Eu_{0.02}:Cl_{0.04+x}$ when the europium source is $EuCl_3$; and $Ca_{0.16}Sr_{0.82}AlSiN_3Eu_{0.02}:Cl_x$ when the europium source is $Eu_2O_3$. Following the trend set by the R630 compounds, these R640 compounds show an increase in emission wavelength as chlorine is added, and photoluminescent intensity decreases somewhat as well. CIE changes for those compounds are shown in FIGS. 9A and 9B.

Photoluminescence as a function of emission wavelength for both the R630 and R640 type of compounds, when no additional halogen is provided by a flux such as $NH_4F$ or $NH_4Cl$, is shown in FIGS. 10A-B. In both cases (R630 and R640) the fluorinated versions demonstrated the highest intensities, followed by the chlorinated versions. The non-halogenated versions (provided by synthesizing R630 and R640 with the oxide of europium, $Eu_2O_3$, so that no halogen was added) showed the lowest intensities. The order of the compounds exhibiting the longest emission wavelength was different, however, with the non-halogenated compound having the longest wavelength in R630, and the shortest of the respective series in R640.

Since fluorine doping of R630 and R640 was shown to provide the highest photoluminescent intensity (FIGS. 10-A-B), the two were compared on the same graph, in FIG. 10C (notwithstanding a slight variation in the R640 formula), along with another nitride-based phosphor having the formula $Ca_{0.157}Sr_{0.808}AlSiN_3Eu_{0.035}$, designated R645. This nomenclature comes from the phosphor emitting at 645 nm; the reader will note in FIG. 10C that it also had the lowest intensity when compared to R630 and R640. FIG. 10C is a collection of emission spectra of the nitride-based red phosphors having the designations R630, R640, and R645, the numbers in the designations indicating roughly the peak emission wavelength of that particular phosphor. The formulas of those three phosphors are, respectively, $Ca_{0.2}Sr_{0.79}AlSiN_3Eu_{0.01}$ (R630), $Ca_{0.158}Sr_{0.815}AlSiN_3Eu_{0.023}$, (R640), and $Ca_{0.157}Sr_{0.808}AlSiN_3Eu_{0.035}$ (R645), where $EuF_3$ was used as the source of europium in each of the three compositions. This data set shows that photoluminesce intensity decreases with increasing peak emission wavelength.

In the experiments described above that investigated the influence of a halogen inclusion, one will have observed that, to various degrees, strontium (Sr) was used to substitute for calcium (Ca). The effect of strontium substitution in a $CaAlSiN_3$ host will be investigated more thoroughly in the next section, along with a few other elemental substitutions and inclusions.

Optical Properties of Compositions Having Sr Substitute for Ca

The effect of varying the ratio of the two divalent elements, when those elements are strontium and calcium, is shown in FIG. 11. In FIG. 11 the inclusion of the second divalent metal Sr is shown increasing from left to right along the x-axis of the graph, from a value of no strontium (x=0) to a value of 100% (where there is no calcium at x=1).

FIG. 11 contains two parts: the first is peak emission wavelength shown in FIG. 11A, and the second is photoluminescent (PL) value shown in FIG. 11B. The tested samples are compounds having the general formula $Ca_{0.98-x}Sr_xAlSiN_3Eu_{0.02}$. Thus, the two divalent elements that are simultaneously present in this phosphor are calcium and strontium, with the exceptions of the endpoints, shown for comparison where only one metal is present. The results in FIG. 1 show that as the strontium content "x" is increased from 0 to 1, the wavelength of the peak emission first increases slightly, meaning that the emission is becoming more red (where the longest wavelength occurs at x=0.2); then decreases gradually, from a maximum of about 660 nm (x=0.2) to final value of about 637 nm (at x=1). The photoluminescence in FIG. 11B is generally about constant between x=0 to x=0.8, but then decreases substantially as the strontium content is increased from x=0.8 to x=0.9.

FIG. 12 is a collection of normalized emission spectra (FIG. 12A), to show the effect of maximum emission wavelength of a high ratio of Sr to Ca in the present phosphors; and emission spectra that has not been normalized (FIG. 12B) of the same two compounds having the formula $Ca_{0.98-x}Sr_xAlSiN_3Eu_{0.02}$ with x=0.82 and x=0, respectively, to show relative brightness. The emission peak wavelength changed as much as about 20 nm, from 658 nm to 638 nm for x=0 and x=0.82, respectively, but the x=0.82 strontium content doped samples are brighter as well.

FIG. 13 shows the effect of doping the present nitride-based red phosphors with further amounts of an alkaline earth metal; specifically, Ca, Sr, and Ba replacing a portion of the Ca/Sr mix discussed in previous paragraphs. Here the compound under study had the formula $Ca_{0.2}Sr_{0.74}AlSiM_{0.05}N_3Eu_{0.01}$, where M was Ca, Sr, Ba, respectively, with M as 0 being used as a control for the experiment. The europium source was the fluorinated $EuF_3$; likewise, alkaline earth fluorides were used as the sources of the Ca, Sr, and the Ba. This data set shows that the peak emission wavelength shifts to longer wavelengths with the addition of the 5% alkaline earth metal. The order of the wavelength increase was Ca, then, Sr, and finally Ba.

FIGS. 14A and 14B are a collection of emission wavelengths, the raw data shown in FIG. 14A, and a normalized version shown in FIG. 14B, for a nitride-based red phosphor with a 5% level of a group IIIA (of the periodic table) metal M, where M is in this example either boron or gallium. These doping metals (semiconductors and/or semi-metals) are shown in the following formula as substituting for the trivalent metal aluminum: $Ca_{0.2}Sr_{0.79}Al_{0.95}SiM_{0.05}N_3Eu_{0.01}$:F. Again, $EuF_3$ was used as the source of both the activator europium, as well as the halogen dopant that substitutes for nitrogen. Here, the peak emission wavelength shifted to longer wavelengths (shown best in the normalized data set of FIG. 14B), and the photoluminescence decreased (shown best in the non-normalized data set of FIG. 14A), with the addition of the 5% alkaline earth metal, in the order of boron and gallium.

The Activator

FIG. 15A is a graph showing peak emission wavelength changes as a function of Eu source and content, where Eu sources include the oxide, fluoride, and chloride salts of the europium metal. The compound chosen for this study was $Ca_{0.2}Sr_{0.8}AlSiN_3Eu_x$, where the parameter "x" represents the amount of the Eu activator present; its value ranging from 0.005 to 0.015 in this experiment. The data shows that the peak emission wavelength shifts to longer wavelengths (a deeper red color) as the Eu content is increased, with the phosphors synthesized from the fluoride of europium showing the longest wavelengths of the group. The phosphors synthesized from the chlorides of europium demonstrated the shortest wavelengths with the oxides in the middle of the data set: this set shows that a particularly desired emission wavelength may be achieved via the proper selection of starting materials (in this case, the nature of the europium source).

Not only do the $EuF_3$ generated samples emit at longer wavelengths than $Eu_2O_3$ based samples having the same europium content, but the $EuF_3$ generated samples are brighter as well. This is illustrated in FIG. 15B. The data in FIG. 15B is in a format that is similar to that of FIG. 15A, but this time photoluminescence (PL) is plotted as a function of europium content. Again, data was collected for three types of compounds; those synthesized from the fluorides, chlorides, and oxides of the europium metal. Here, the photoluminescence first increased as the europium content was increased, reaching a maximum at a content of about 0.01. Higher than values of 0.01, values to 0.015, the photoluminescence either leveled off, or decreased slightly for the three variations of $Ca_{0.2}Sr_{0.8-x}AlSiN_3Eu_x$. While it is not precisely known whether this is due to the inclusion of halogen or absence of oxygen (by a halogen-instigated oxygen gettering effect), it is recognized that either way, the effect is advantageous.

Activators that may be used in conjunction with the present red nitrides, in particular the rare earths, include Mn, La, Ce, Pr, Nd, Pm, Sm, Gd, Tb, Dy, Ho, Er, Tm, Yb, and Lu. These activators may be used in any combination, and in the desired amounts, up to and including 5 atomic percent.

Excitation Spectra of the Present Nitride-Based Red Phosphors

FIG. 16 is a collection of excitation spectra for the R630 composition having the formula $Ca_{0.2}Sr_{0.8}AlSiN_3Eu_{0.01}$, and the R640 composition having the formula $Ca_{0.158}Sr_{0.815}AlSiN_3Eu_{0.023}$. Excitation spectra are taken by measuring the photoluminescence at a chosen wavelength, in this case around 630 to 640 nm, as a function of the wavelength of the incoming excitation radiation used to cause the phosphor(s) to photoluminesce. In this experiment, the wavelength of the excitation radiation was increased from about 400 nm, which lies in the UV to visible purple range of the electromagnetic spectrum, to about 600 nm, which is orange and approaching red. The data shows that the exemplary phosphors of the present embodiments are efficient at photoluminescing when the wavelength of the excitation radiation ranges from about 400 to about 550 nm (yellow).

The present phosphors may also be activated in the ultraviolet and near-ultraviolet, at wavelengths ranging from about 250 to 400 nm.

X-Ray Diffraction (XRD) Pattern of the Present Nitride-Based Red Phosphors

An x-ray diffraction (XRD) pattern of one of the typical compositions of the present embodiments is shown in FIG. 17. The particular compound examined was $Ca_{0.2}Sr_{0.79}AlSiN_3Eu_{0.01}$:F. It may be seen that this compound has the $CaAlSiN_3$-type structure by comparing its x-ray diffraction pattern (FIG. 17 of the present disclosure) with the patterns of a $CaAlSiN_3$ host, and $CaAlSiN_3$ host activated with Eu (FIGS. 1-1 and 1-2 of US 2007/0007494, respectively).

Nitride-based, red-emitting phosphors of the present embodiments, even with large amounts of Sr present and replacing Ca, may be identified by the presence of what is perhaps the highest intensity diffraction peak at a 2θ of about 36 degrees, representing diffraction from the (311) plane; another high intensity at about 35 degrees from the (002) peak; a peak at about 32 degrees from the (310) plane; a set of peaks at 40-41 degrees from the (221) plane; and a set of peaks at 48 degrees from the (312) and/or (022) planes. That the intensities of the peaks in FIG. 17 of the present disclosure differ from those of US 2007/0007494, with respect to the (hkl) planes identified above, is indicative of a slight shifting of the atomic positions within the unit cell as a result of the substitutions and inclusions of the present compounds.

Distribution of Halogen on Nitrogen Sites, Oxygen Gettering by Halogen, and Oxygen Content Embodiments of the present invention are directed to the fluorescence of a nitride-based deep-red phosphor having at least one of the following novel features: 1) an oxygen content less than about 2 percent by weight, and 2) a halogen content of virtually any amount. Such phosphors are particularly useful in the white light illumination industry, which utilizes the so-called "white LED," as well as in backlighting applications, which also utilize white light. The selection and use of a rare earth halide as a raw material source of not only the rare earth activator for the phosphor, but also the halogen, is a key feature of the present embodiments. While not wishing to be bound by any particular theory, it is believed the halogen may play a dual role in enhancing the properties of these phosphors: by reducing the oxygen content in addition to causing an increase in photoluminescent intensity and spectral emission.

Apart from an advantage of mechanical rigidity there is another consequence of the $CaAlSiN_3$:$Eu^{2+}$-type structures of the present embodiments with two types of nitrogen sites; and that is that the distribution of halogen dopants and/or and oxygen impurities is not random. Hirosaki et al. describe in U.S. Publication No. 2007/0007494 how in such a situation the "N is replaced with one or two or more elements selected from the group consisting of O and F." But Hirosaki et al. do not say how the O and F replace N, and they do not teach the gettering abilities of the halogen that are believed by the present inventors to reduce oxygen contamination. Using a nomenclature whereby a nitrogen site corner-shared by two Al/Si tetrahedral is designated as N2, and a nitrogen vertex corner-shared by three Al/Si tetrahedra as N3, the present inventors propose that, in at least some situations, the oxygen impurity occupies an N2 site because the $O^{2-}$ valence (2-) is lower than that of the $N^{3-}$ valence (3-). If this is so, then it stands to reason that the monovalent halogen ions $F^-$ and $Cl^-$ also prefer to occupy N2 sites, rather than N3 sites, for the same reasons of free energy minimization. In one embodiment of the present invention, oxygen and halogen compete for the same atomic positions in the unit cell. Another way of describing the two types of nitrogen sites is that the N2 site is 2-fold coordinated, and the N3 site is 3-fold coordinated.

According to embodiments of the present invention, at least half (50 percent) of the halogen content (either by weight or by number) resides on N2 sites rather than N3 sites. In another embodiment, at least 80 percent of the halogen content (either by weight or by number) resides on N2 sites as opposed to N3 sites. In some embodiments, the desired distribution of halogen on the N2 relative to N3 sites may be achieved by synthesizing the phosphor according to liquid mixing methods, including liquid precipitation, and the sol gel technique. But regardless of the synthetic method, which means that including solid state reaction mechanisms, the present inventors believe that their method of halogen inclusion is related to a low oxygen impurity content. "Low oxygen impurity content" means less than about 2 weight percent oxygen. In some embodiments, low oxygen impurity means less than about 1.9 weight percent oxygen, and less than about 1.8 weight percent oxygen.

Oxygen impurity has been discussed by the present inventors in a co-pending application titled "Nitride-based red phosphors," filed Oct. 13, 2008, having application Ser. No. 12/250,400. Application Ser. No. 12/250,400 is hereby incorporated herein by its entirety. That application discussed U.S. Pat. No. 7,252,788 to Nagatomi et al., who discovered and disclosed in U.S. Pat. No. 7,252,788 that when the oxygen content in the phosphor is large, the emission efficiency decreased (not desirable), and the emission wavelength of the phosphor also tended to shift to a shorter wavelength side. This latter observation is also undesirable because most (if not all) manufacturers are attempting to add a phosphor that is deeper in the red region (i.e., less orange or yellow) for the color rendering benefits a red phosphor offers to the white LED industry. Nagatomi et al. continue: the phosphor they provided includes no oxygen in the host material, with the benefits of exhibiting a higher emission efficiency, and avoiding the shift of the emission wavelength to the shorter wavelength side [of the spectrum].

But this is more easily stated than accomplished. Oxygen contamination was addressed by Nagatomi et al. in US 2006/0017365, where it is taught that the source is believed to be the oxygen adhering to the surface of the raw materials, and thus introduced at the start of the synthesis; oxygen added as a result of oxidation of the surface of the raw materials at the time of preparation for firing, and the actual firing, and the oxygen adsorbed onto the surface of the phosphor particles after firing.

A discussion of oxygen measurements, and an analysis of the possible causes for a discrepancy between measured and calculated values, was also given by Nagatomi et al. in US 2006/0017365. The oxygen content that was measured in their sample was 2.4 percent by weight, to be contrasted with a calculated oxygen concentration of 0.3 percent by weight. The origin of this approximately 2 percent by weight difference between the measured value (with its so-called "excessive oxygen") versus the calculated amount was attributed to oxygen originally adhering to the surface of the raw materials at the time of preparation of the firing and at the time of firing, and the oxygen adsorbed onto the surface of the phosphor specimen after the firing.

The oxygen content in Nagatomi et al.'s samples of U.S. Pat. No. 7,252,788 similarly show a 2 plus percent by weight value: 2.2, 2.2, and 2.1 in Tables 1 and 3.

Hirosaki et al. (US 2007/0007494) teach a $CaAlSiN_3$ family of crystal phases, where the "N is replaced with one or two or more elements selected from the group consisting of O and F." In the case of oxygen, its content in a $CaAlSiN_3$:Eu phosphor was measured. A synthesized compound having the intended formula $Eu_{0.008}Ca_{0.992}AlSiN_3$ was pulverized and a compositional analysis performed by ICP emission spectrometry. The oxygen and nitrogen in the sample were measured in a LECO model TC-436 oxygen and nitrogen analyzer. The oxygen content was determined to be 2.0±0.1% by weight, and its presence was attributed to oxygen impurities contained in the nitrides of the metals (Si, Al, Ca) used as starting materials. Thus the composition of the synthesized inorganic compound, calculated from the analytical results, is $Eu_{0.0078}Ca_{0.9922}Si_{0.9997}Al_{0.9996}N_{2.782}O_{0.172}$. The fluorine content was not measured in any of the samples.

Measured oxygen content of the present R630 phosphors, whose formulas have been given in preceeding sections, are about 1 weight percent. The measured oxygen content of the R640 phosphors was about 1.35 weight percent.

Application in Backlighting and White Light Illumination Systems

According to further embodiments of the present invention, the present red phosphors may be used in white light illumination systems, commonly known as "white LEDs," and in backlighting configurations for display applications. Such white light illumination systems comprise a radiation source configured to emit radiation having a wavelength greater than about 280 nm; and a halide anion-doped red nitride phosphor configured to absorb at least a portion of the radiation from the radiation source, and emit light with a peak intensity in a wavelength range greater than or equal to about 630 nm. Exemplary spectra of light intensity versus wavelength emitted by these warm white luminescent systems are shown in FIGS. 18A-18E. The properties of the present nitride-based, red phosphors are also suitable as components of a backlighting illumination system.

For these applications, the present nitride-based red phosphor may combined with any of a yellow, green, or orange emitting phosphor, used either singly or in any variety of combinations as desired, in a phosphor mix or package. The yellow, green, or orange phosphors may be either aluminate or silicate-based. Exemplary yellow, yellow-green, and green silicate-based phosphors may be of the form $M_2SiO_4$, where M is a divalent metal such as an alkaline earth (e.g., Mg, Ca, Sr, and Ba, singly or in combinations), or other such elements such as Zn. Exemplary orange silicate-based phosphors may be of the form $M_3SiO_5$, where M is defined as above in this paragraph. These silicate-based orange and/or green phosphors may additionally contain a halogen such as F or Cl, and in some embodiments, this halogen anion substitutes for oxygen and may reside on oxygen lattice sites in the crystal.

Exemplary silicate-based yellow-green phosphors that are particularly suitable for combination with the present nitride-based red phosphors have been described by the present inventors in U.S. Pat. No. 7,311,858 to Wang et al. The phosphors disclosed in the patent have the formula $M_2SiO_4$:$Eu^{2+}$ D, where M is a divalent metal selected from the group consisting of Sr, Ca, Ba, Mg, Zn, and Cd, and D is a dopant selected from the group consisting of F, Cl, Br, I, P, S, and N. The dopant D is present in the phosphor in amounts ranging from about 0.01 to about 20 mole percent, and at least some of the dopant anions substitute for oxygen anions. These silicate-based phosphors are configured to absorb radiation in a wavelength ranging from about 280 nm to about 490 nm, and to emit visible light in wavelengths ranging from about 460 to about 590 nm. U.S. Pat. No. 7,311,858 is incorporated herein in its entirety.

Exemplary silicate-based green emitting phosphors suitable for use with the present red nitrides have been described by the present inventors in the Patent Application Publication US 2006/0145123 to Cheng et al. These phosphors are also of the $M_2SiO_4$ form, specifically having the formula $(Sr,A_1)_x(Si,A_2)(O,A_3)_{2+x}$:$Eu^{2+}$, where $A_1$ is at least one divalent cation selected from the group consisting of Mg, Ca, Ba, or Zn, or a combination of 1+ and 3+ cations; $A_2$ is a 3+, 4+, or 5+ cation, including at least one of B, Al, Ga, C, Ge, N, and P; $A_3$ is a 1-, 2-, or 3-anion, including any of F, Cl, Br, and S. In this formulation, x is any value between 1.5 and 2.5, both inclusive. The formula is written to indicate that the $A_1$ cation replaces Sr; the $A_2$ cation replaces Si, and the $A_3$ anion replaces O. The amounts of the $A_1$, $A_2$, and $A_3$ ions (whether cationic or anionic) each range from about 0 to about 20 mole percent. Patent Application Publication US 2006/0145123 is incorporated herein in its entirety.

Exemplary silicate-based orange emitting phosphors suitable for use with the present red nitrides have been described by the present inventors in the Patent Application Publication US 2007/0029526 to et al. These phosphors are also of the $M_3SiO_5$ form, specifically having the formula $(Sr_{1-x}M_x)_y$Eu$_x$SiO$_5$, where M is at least one of a divalent metal selected from the group consisting of Ba, Mg, Ca, and Zn; $0<x<0.5$; $2.6<y<3.3$, and $0.001<z<0.5$. Patent Application Publication US 2007/0029526 is incorporated herein in its entirety.

Figure 18A:
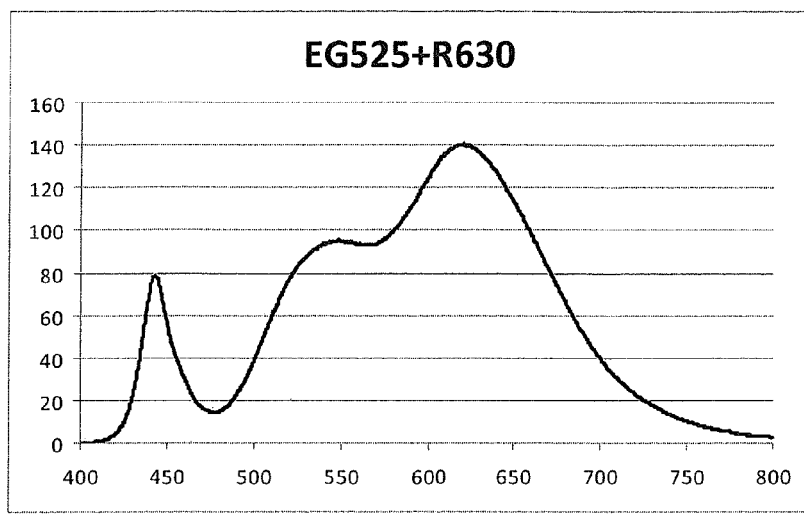
Figure 18B:
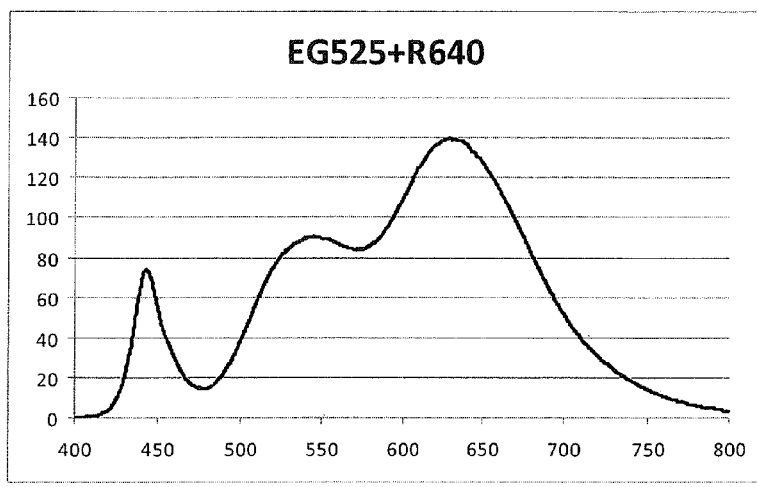
Figure 18C:
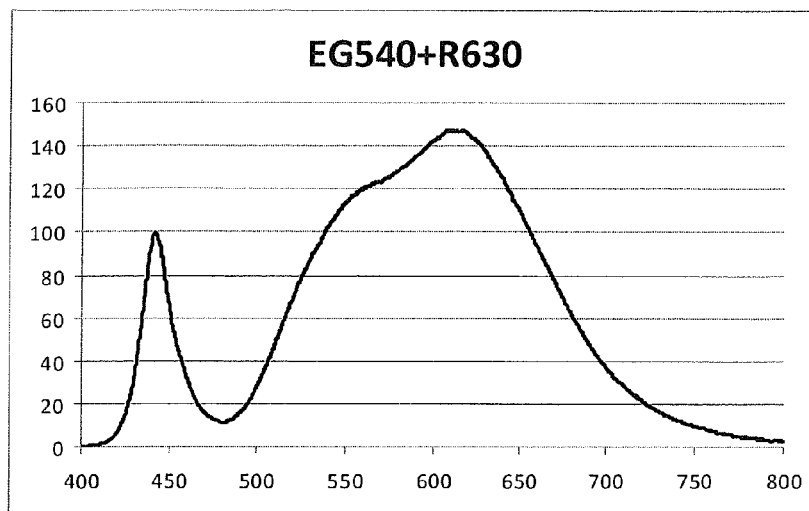
Figure 18D:
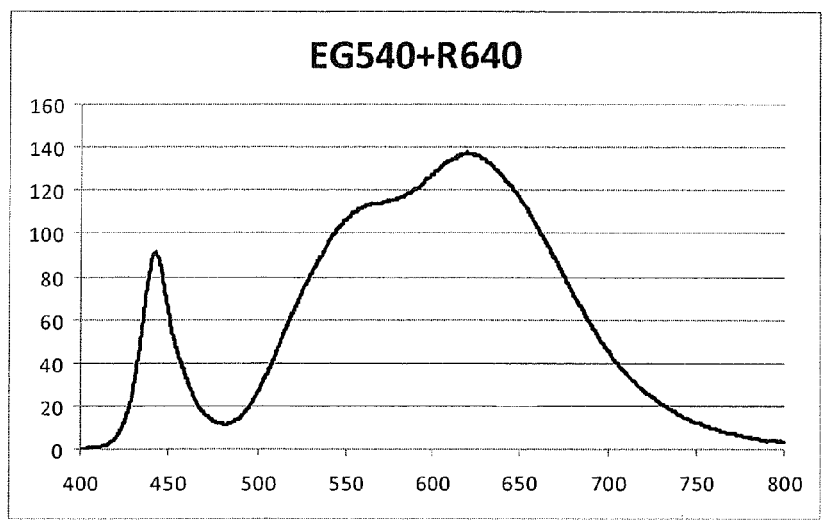
Figure 18E:
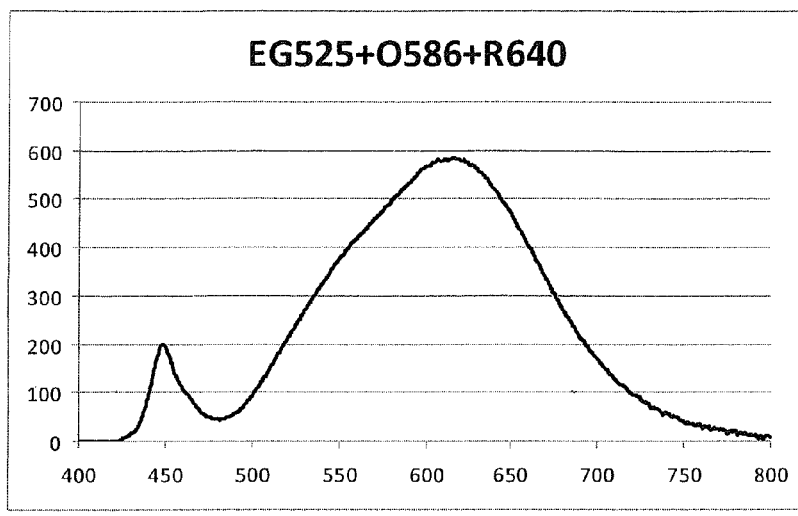

Specific combinations of orange-emitting silicates and the present red emitting nitrides; green-emitting silicates and the present red emitting nitrides; various combinations thereof (meaning combinations of orange and green-emitting silicates with the present red emitting nitrides), for use in backlighting and warm white light illumination systems, will be described next. Exemplary data is shown in FIGS. 18A-18E, and the combinations are: a green phosphor emitting at about 525 nm (EG525) plus the R630 red phosphor previously described (FIG. 18A); the same green EG 525 nm phosphor in combination with the R640 phosphor previously described (FIG. 18B); a green phosphor emitting at about 540 and the R630 red nitride (FIG. 18C); the green EG540 phosphor in combination with the red R640 phosphor (FIG. 18D), and finally, a three-component system having a green phosphor EG540, an orange phosphor emitting at 586 nm (designated O586), and the red R640 nitride (FIG. 18E). Each of the red nitride phosphor compositions may have oxygen contents that are less than or equal to about 2 weight percent.

The compositions of the red nitrides used in the examples of FIGS. 18A-18E are as follows: the R630 phosphor has the formula $Ca_{0.2}Sr_{0.8}AlSiN_3Eu_{0.01}$:F, and the R640 phosphor has the formula $Ca_{0.158}Sr_{0.815}AlSiN_3Eu_{0.023}$:F. The green phosphor EG540 is the chlorinated version of an $M_2SiO_4$ silicate, and has the formula $Sr_{0.925}Ba_{1.025}Mg_{0.05}Si_{0.03}(O,Cl)_4$:$Eu^{2+}$. The EG540 green phosphor is also chlorinated, having the formula $Sr_{1.15}Ba_{0.8}Mg_{0.05}Si_{1.03}(O,Cl)_4$:$Eu^{2+}$. The O586 orange phosphor is a fluorinated version of the $M_3SiO_5$ silicate, and this particular phosphor has the formula $Sr_3Eu_{0.06}Si_{1.02}O_5F_{0.18}$.

Each of the figures gives the CIE x and y coordinates for the white light illumination resulting from these exemplary combinations, the color coordinated temperature (CCT), the brightness, and the color rendering index $R_a$. Although specific examples of yellow, green, and orange phosphors that may be used in conjunction with the present nitride-based red phosphors, this is not to say the present red nitrides are restricted to use with those phosphors. According to embodiments of the present invention, the present nitride-based red phosphors (having a desired distribution of the halogen over N2 and N3 sites, and/or having an oxygen content less than about 2 weight percent), may be used with virtually any blue, yellow, green, orange, or other type of red phosphor, regardless of structure or chemical makeup, in the white LED and backlighting display arts.

Many modifications of the exemplary embodiments of the invention disclosed above will readily occur to those skilled in the art. Accordingly, the invention is to be construed as including all structure and methods that fall within the scope of the appended claims.

What is claimed is:

1. A nitride-based, red emitting compound having the formula $MAlSiN_3$:$Eu^{2+}$, wherein M is at least one of Ca and Sr, further comprising a halogen whose content ranges from greater than about zero to about 2 atomic percent, wherein at least half of the halogen is distributed on 2-fold coordinated nitrogen (N2) sites relative to 3-fold coordinated nitrogen (N3) sites.

2. The compound of claim 1, wherein the halogen is selected from the group consisting of F and Cl.

3. The compound of claim 1, wherein the impurity oxygen content is less than about 2 percent by weight.

4. The compound of claim 1, wherein the impurity oxygen content is less than about 1.9 percent by weight.

5. The compound of claim 1, wherein the impurity oxygen content is less than about 1.8 percent by weight.

6. The compound of claim 1, wherein the halogen is F.

7. The compound of claim 1, wherein M consists of Ca and Sr.

8. An RGB lighting system for use in a white LED or backlighting display application, the RGB lighting system comprising:
   the nitride-based, red-emitting phosphor according to claim 1,
   a green phosphor, and
   a blue LED emitting in a wavelength ranging from about 400 nm to about 550 nm.

9. The compound of claim 1, wherein at least 80% of the halogen is distributed on 2-fold coordinated nitrogen (N2) sites relative to 3-fold coordinated nitrogen (N3) sites.

10. The compound of claim 9, wherein the impurity oxygen content is less than about 2 percent by weight.

11. The compound of claim 9, wherein the impurity oxygen content is less than about 1.9 percent by weight.

12. The compound of claim 9, wherein the impurity oxygen content is less than about 1.8 percent by weight.

13. The compound of claim 9, wherein the halogen is selected from the group consisting of F and Cl.

14. The compound of claim 9, wherein the halogen is F.

15. The compound of claim 9, wherein M consists of Ca and Sr.

16. An RGB lighting system for use in a white LED or backlighting display application, the RGB lighting system comprising:
   the nitride-based, red-emitting phosphor according to claim 9,
   a green phosphor, and
   a blue LED emitting in a wavelength ranging from about 400 nm to about 550 nm.

* * * * *